(12) United States Patent
Hibino et al.

(10) Patent No.: US 7,369,907 B2
(45) Date of Patent: May 6, 2008

(54) PORTABLE INFORMATION PROCESSOR AND INFORMATION PROCESSING METHOD

(75) Inventors: Yoshiki Hibino, Tokyo (JP); Mototsugu Tsutsui, Kanagawa (JP); Yoshiteru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 793 days.

(21) Appl. No.: 10/149,402

(22) PCT Filed: Oct. 12, 2001

(86) PCT No.: PCT/JP01/09003

§ 371 (c)(1),
(2), (4) Date: Jun. 11, 2002

(87) PCT Pub. No.: WO02/31633

PCT Pub. Date: Apr. 18, 2002

(65) Prior Publication Data

US 2002/0181722 A1 Dec. 5, 2002

(30) Foreign Application Priority Data

Oct. 13, 2000 (JP) .............................. 2000-313758

(51) Int. Cl.
*G06F 17/00* (2006.01)
(52) U.S. Cl. ................................... 700/94; 348/333.01
(58) Field of Classification Search .................. 381/26, 381/122; 700/94; 345/173; 348/333.01
See application file for complete search history.

(56) References Cited

U.S. PATENT DOCUMENTS 5,559,554 A * 9/1996 Uekane et al. ......... 348/333.02
6,518,956 B1 * 2/2003 Sato ........................... 345/173
6,937,280 B2 * 8/2005 Kawai et al. .......... 348/333.06

FOREIGN PATENT DOCUMENTS

| JP | 05-242040 | 9/1993 |
|----|-----------|--------|
| JP | 06-301443 | 10/1994 |
| JP | 8-84286 | 3/1996 |
| JP | 08-101730 | 4/1996 |
| JP | 08-179851 | 7/1996 |

(Continued)

OTHER PUBLICATIONS

English translation of JP 2000-165719; Hiroshi Shibata.*
English translation of jp 08-084286; Takeshi Kojima.*

*Primary Examiner*—Ping Lee
(74) *Attorney, Agent, or Firm*—Oblon, Spivak, McClelland, Maier & Neustadt, P.C.

(57) ABSTRACT

The present invention relates to a portable information processing device having a body part (2) and a display part (3) supported so that it can open/close and rotate on the body part (2). The portable information processing device has a stereo microphone (53) provided in the display part (3), a detecting unit (83) for detecting the opening/closing state and the rotating state of the display part (3) with respect to the body part (2), a control unit for allocating a first channel signal and a second channel signal of an audio signal outputted from the stereo microphone (53) to a right channel signal and a left channel signal on the basis of the result of the detection by the detecting unit, and a recording unit for recording the audio signal allocated by the control unit. The inputted audio signal is appropriately allocated to a right channel signal and a left channel signal and thus recorded in accordance with the opening/closing state and the rotating state of the display part (3) with respect to the body part (2) and the rotating state of an image pickup unit with respect to the display part (2).

7 Claims, 20 Drawing Sheets

FOREIGN PATENT DOCUMENTS

| | | |
|---|---|---|
| JP | 09-311776 | 12/1997 |
| JP | 10-051665 | 2/1998 |
| JP | 10-164414 | 6/1998 |
| JP | 11-275416 | 10/1999 |
| JP | 2000-020164 | 1/2000 |
| JP | 2000-165719 | 6/2000 |
| JP | 2000-312306 | 11/2000 |
| JP | 2001-500709 | 1/2001 |

* cited by examiner

| MODE | LID SWITCH | LCD SWITCH | CAMERA SWITCH | CAMERA OUTPUT | PREVIEW SETTING | IMAGE SHOWN IN PREVIEW | MICROPHONE | SPEAKER |
|---|---|---|---|---|---|---|---|---|
| NON USE | ON | OFF | OFF | | | | | |
| | ON | OFF | ON | | | | | |
| PC | OFF | OFF | OFF | NORMAL IMAGE | HORIZONTAL INVERSION | HORIZONTAL INVERSION | R-L | L-R |
| | OFF | OFF | ON | NORMAL IMAGE | HORIZONTAL INVERSION | HORIZONTAL INVERSION | R-L | L-R |
| SHOOTING WITH TRIPOD | OFF | ON | OFF | NORMAL IMAGE | — | NORMAL IMAGE | L-R | R-L |
| | OFF | ON | ON | NORMAL IMAGE | — | NORMAL IMAGE | L-R | R-L |
| SHOOTING OF OTHER | ON | ON | OFF | NORMAL IMAGE | — | NORMAL IMAGE | L-R | R-L |
| SHOOTING OF SELF | ON | ON | ON | VERTICAL AND HORIZONTAL INVERSION | HORIZONTAL INVERSION | HORIZONTAL INVERSION | R-L | R-L |

FIG.17

PORTABLE INFORMATION PROCESSOR AND INFORMATION PROCESSING METHOD

TECHNICAL FIELD

This invention relates to a portable information processing device, an information processing method and a program storage medium, and particularly to a portable information processing device having a body part and a display part which is supported on the body part so that it can open/close and rotate, an information processing method in this information processing device, and a program storage medium used for the portable information processing device.

BACKGROUND ART

Conventionally, a portable information processing device has been used which has a display part supported so that it can open/close on a computer body having a keyboard including a plurality of operation keys arranged thereon. Some of such conventional portable information processing devices have a stereo microphone provided on the display part.

With respect to the portable information processing device which has the display part supported so that it can open/close on the computer body, for example, if the display part is rotatable on the computer body, the display screen of the display part can be used whether it faces forward or backward. However, if the left and right channels of the stereo microphone are set to be constant, for the user, the left and right channels are inverted depending on the direction of use and the user may feel uncomfortable.

DISCLOSURE OF THE INVENTION

In view of the foregoing status of the art, it is an object of the present invention to provide a new portable information processing device and an information processing method which solve the problems of the conventional portable information processing device as described above, and a program storage medium in which a program used for the information processing device and the information processing method is stored.

It is another object of the present invention to provide a portable information processing device and an information processing method which enables elimination of the user's uncomfortable feeling in any use state.

A portable information processing device according to the present invention comprises: a stereo microphone provided on a display part; a detection means for detecting an opening/closing state and a rotating state of the display part with respect to a body part; a control means for allocating a first channel signal and a second channel signal of an audio signal outputted from the stereo microphone to a right channel signal and a left channel signal on the basis of the result of the detection by the detection means; and a recording means for recording the audio signal allocated by the control means.

An information processing method according to the present invention comprises: a detection processing step of detecting an opening/closing state and a rotating state of a display part with respect to a body part; a control processing step of allocating a first channel signal and a second channel signal of an audio signal outputted from a stereo microphone to a right channel signal and a left channel signal on the basis of the result of the detection of the detection processing step; and a recording processing step of recording the audio signal allocated by the control processing step.

A program storage medium according to the present invention has a computer-readable program stored therein, the program causing a portable information processing device to execute: a control processing step of allocating a first channel signal and a second channel signal of an audio signal outputted from a stereo microphone to a right channel signal and a left channel signal on the basis of an opening/closing state and a rotating state of a display part with respect to a body part; and a recording processing step of recording the audio signal allocated by the control processing step.

In the present invention, the channels of the stereo microphone are switched in accordance with the use state of the portable information processing device.

The other objects and advantages of the present invention will be clarified further from the following description of an embodiment.

BRIEF DESCRIPTION OF THE DRAWINGS

FIG. 17 shows the states of an inverting switch in respective use modes, and the setting of an output state of a camera, the setting of a stereo microphone and the setting of a stereo speaker in the respective states.

BEST MODE FOR CARRYING OUT THE INVENTION

A preferred embodiment of the present invention will now be described with reference to the drawings.

A portable information processing device 1 to which the present invention is applied has a computer body 2 and a display part 3, as shown in FIGS. 1 to 5. In the following description of the computer body 2, the front-and-back direction, the left-and-right direction, and the up-and-down direction are prescribed in the state where operation keys arranged on a keyboard face upward and the display part 3 is situated on the rear side of the computer body 2.

Figure 1:
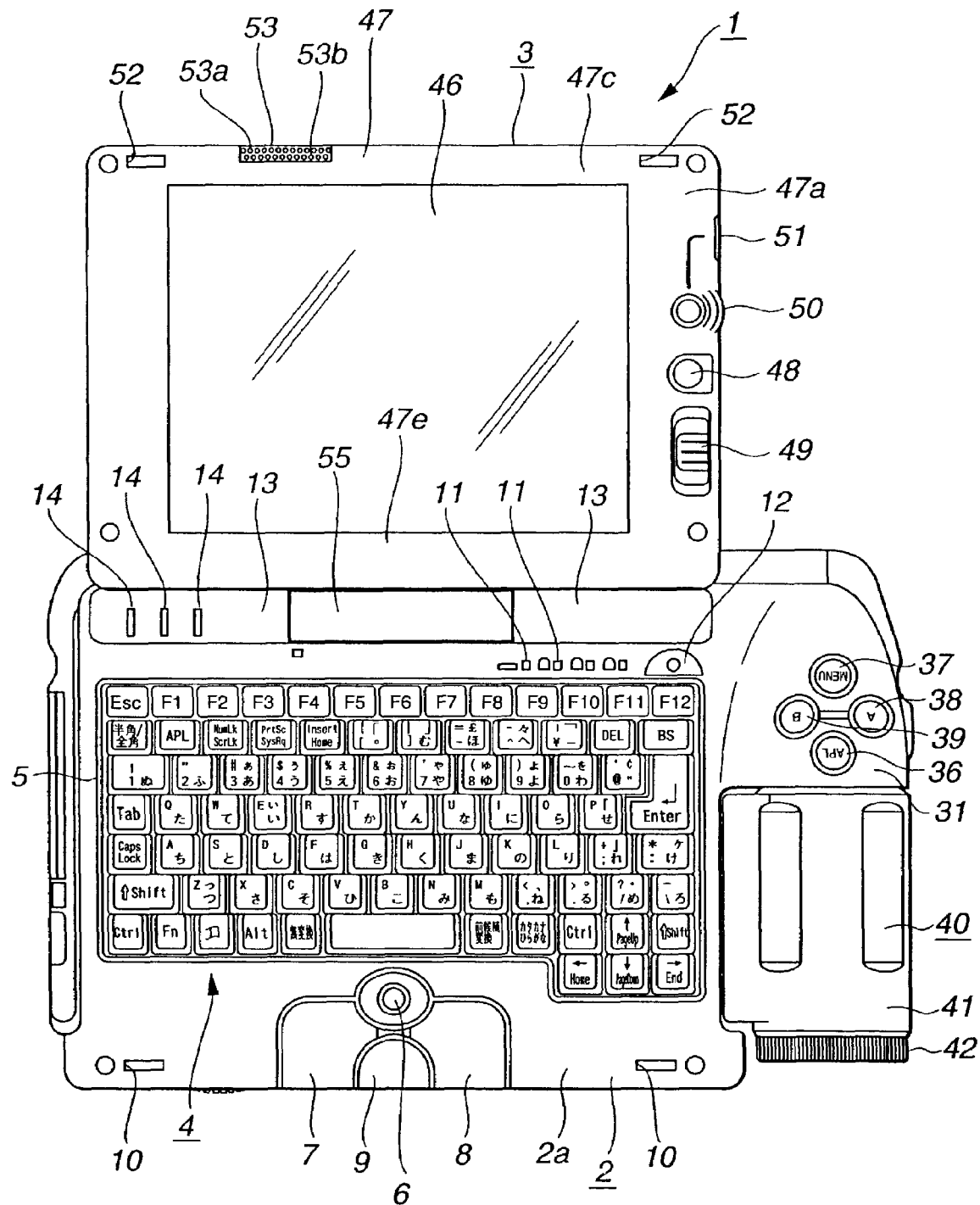
FIG. 1 is a plan view showing a portable information processing device according to the present invention, in which operation keys are opened.

A keyboard 4 is provided on an upper surface part 2a of the computer body 2, and a plurality of predetermined operation keys 5 are arranged on the keyboard 4, as shown in FIG. 1. A processing means such as a CPU (central processing unit) is provided inside the computer body 2, so that various processing is performed on a signal inputted by operating the operation keys 5 on the keyboard 4.

At a central part in the left-and-right direction on the front end of the upper surface part 2a of the computer body 2, a stick-type pointing device 6 used for moving a mouse cursor, a left click button 7 and a right click button 8 corresponding to a left button and a right button of the mouse, respectively, and a center button 9 for scroll operation are provided, as shown in FIG. 1.

On the front end of the upper surface part 2a of the computer body 2, a pair of lock pawl insertion holes 10, 10 are formed away from each other in the left-and-right direction, as shown in FIG. 1. As will be described later, a pair of lock pawls, not shown, provided inside the computer body 2 protrude upward from the respective lock pawl insertion holes 10, 10, when necessary.

On the upper surface part 2a of the computer body 1, a plurality of indicators 11 are provided at a right end part just behind the keyboard 4, and a power button 12 is arranged on the right side of the indicators 11, as shown in FIG. 1.

Figure 2:
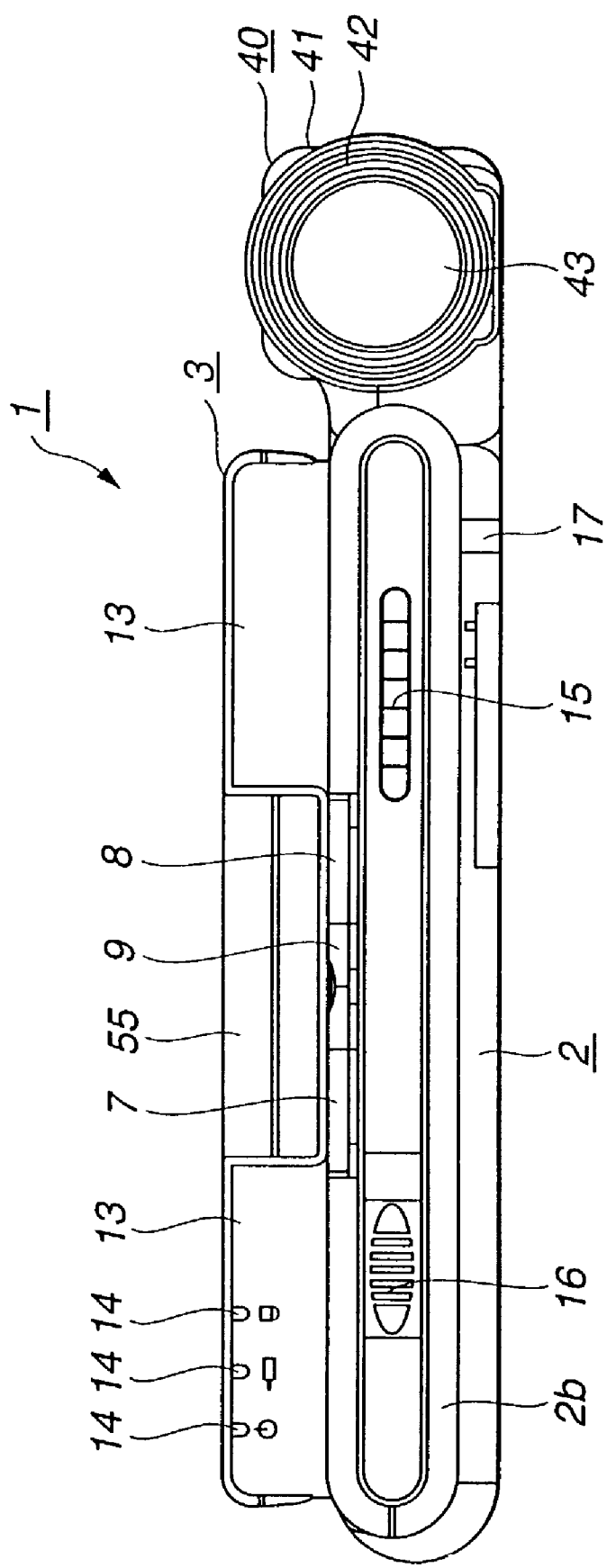
FIG. 2 is a front view of the portable information processing device shown in FIG. 1.

On the rear end of the upper surface part 2a of the computer body 2, supporting protrusions 13, 13 are projected away from each other in the left-and-right direction, and the supporting protrusions 13, 13 are elongated in the left-and-right direction, as shown in FIGS. 1 and 2. Three indicators 14 are provided on the left supporting protrusion 13 and these indicators 14 show the power input state and the like.

A radiation hole 15 is formed at a position close to the right end of a front surface part 2b of the computer body 2, as shown in FIG. 2, and a fan, not shown, is arranged at a position corresponding to the radiation hole 15 inside the computer body 2. A slide knob 16 is supported at a position close to the left end of the front surface part 2b. If the slide knob 16 is slid leftward, the lock pawls protrude upward from the lock pawl insertion holes 10, 10. If the slide knob 16 is slid rightward, the protruding lock pawls are housed into the computer body 2. At a position close to the right end of the computer body 2, a shooting-time lighting lens 17 which is visually recognizable from above and below is provided to cover a portion extending from the front surface part 2b to the bottom surface part. The shooting-time lighting lens 17 is lit at the time of shooting with a camera, as will be described later.

Figure 3:
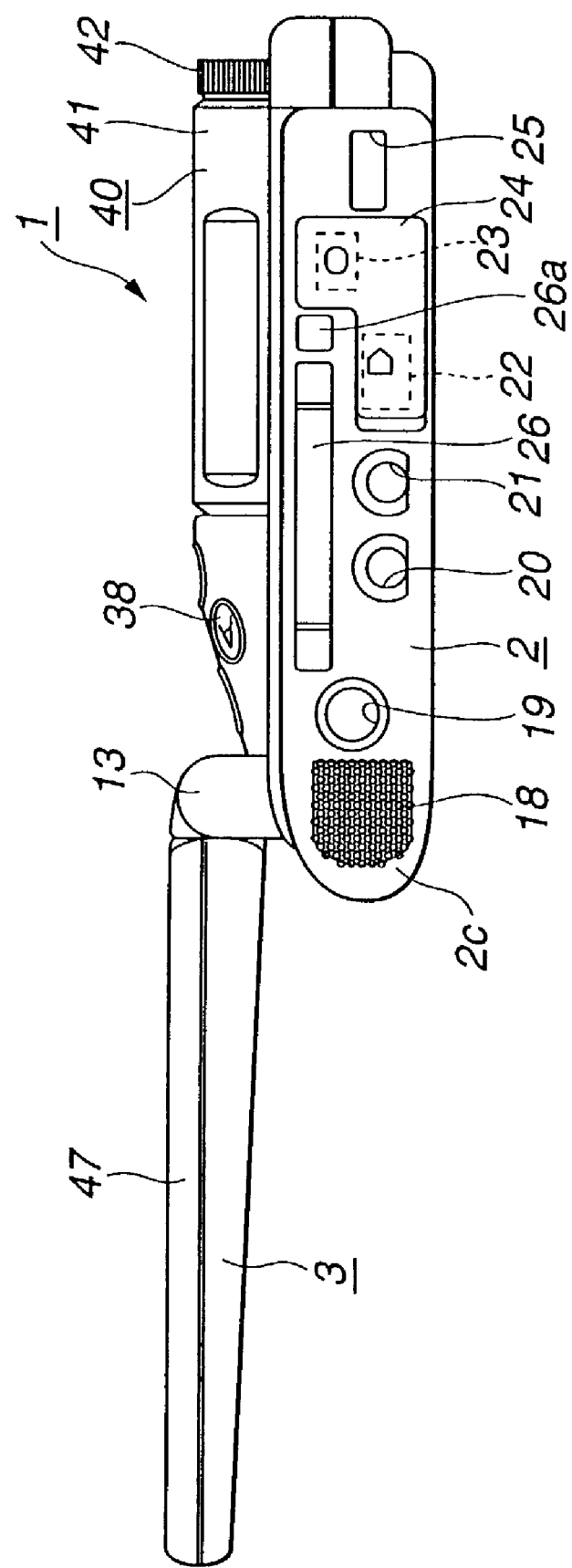
FIG. 3 is a left side view of the portable information processing device shown in FIG. 1.

On a left side part 2c of the computer 2, from its rear side, a stereo speaker 18, a DC jack 19 to which an AC adapter is connected, a LINE IN/MIC connector 20 for connecting various types of recording/reproducing equipments or microphone, and a headphone jack 21 for connecting a headphone are provided, as shown in FIG. 3. On the left side part 2c, a model terminal 22 for modular jack, and an VGA (video graphics array) OUT connector 23 for connecting a monitor are provided on the forward side from the headphone jack 21. These modem terminal 22 and VGA OUT connector 23 are protected by a cover 24 when not in used. Moreover, a USB (universal serial bus) terminal 25 is provided at a front end part of the left side part 2c. Furthermore, a PC card slot 26 for inserting a PC card therein is provided on the left side part 2c, and an ejection button 26a for ejecting the inserted PC card is provided near the PC card slot 26.

Figure 4:
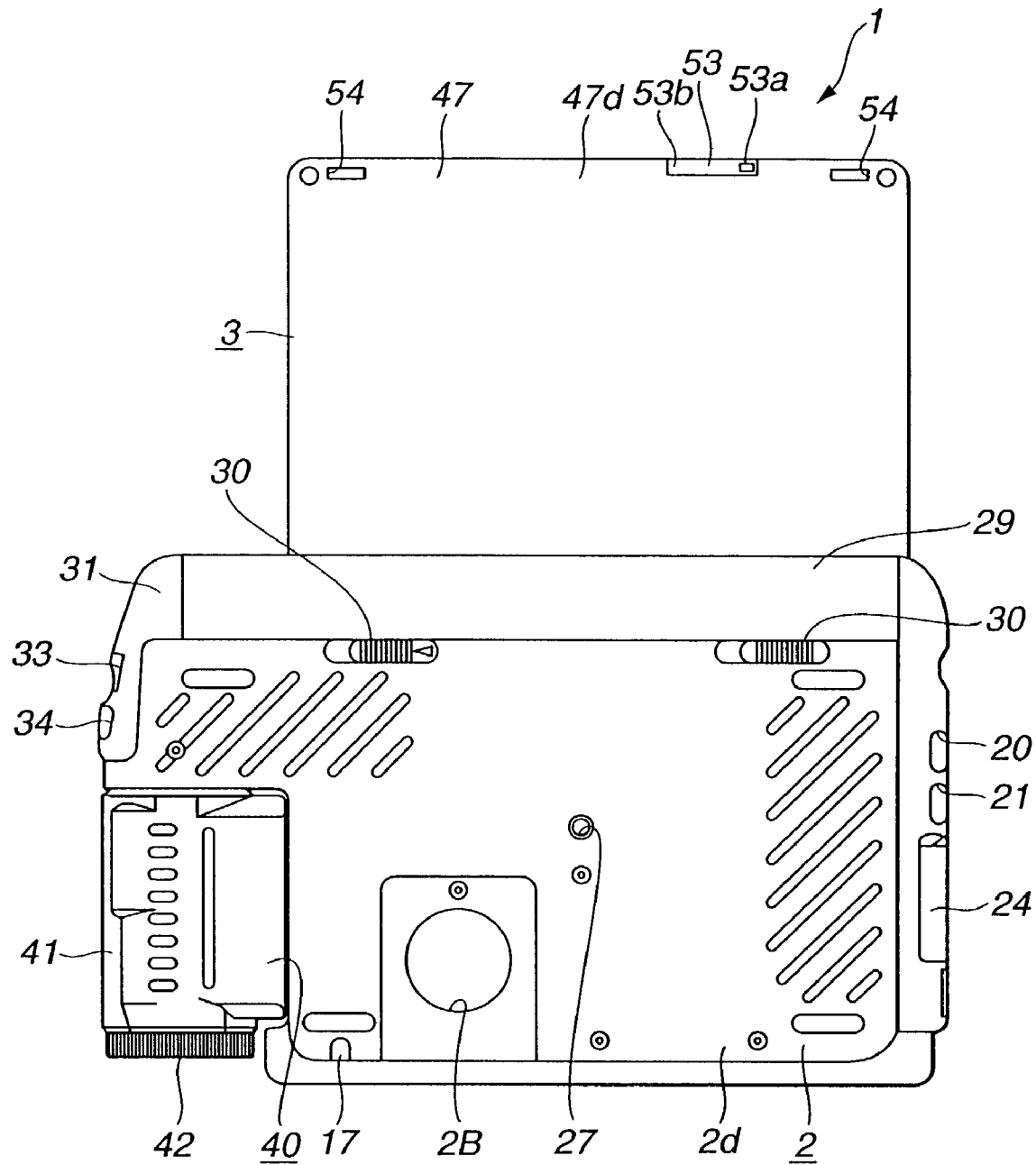
FIG. 4 is a bottom view of the portable information processing device shown in FIG. 1.

On a button surface part 2d of the computer body 2, a tripod screw hole 27 is formed substantially at its central part, as shown in FIG. 4. This tripod screw hole 27 is a hole adapted for setting a tripod. By fixing the portable information processing device 1 with a tripod when shooting with a camera, which will be described later, for example, fixed-point observation can be made.

At a position close to the front end of the bottom surface part 2d of the computer body 2, a holding recess 28 for holding a lens protection cap of a camera unit, which will be described later, is provided, as shown in FIG. 4.

On a rear end part of the computer body 2, a battery pack 29 having a battery mounted therein is removably provided, as shown in FIG. 4. On a rear end part of the bottom surface part 2d, battery knobs 30, 30 are slidably supported away from each other in the left-and-right direction. As the battery knobs 30, 30 are respectively slid in a predetermined direction, the mounted battery pack 29 can be locked to the computer body 2 or can be detached from the computer body 2.

Figure 5:
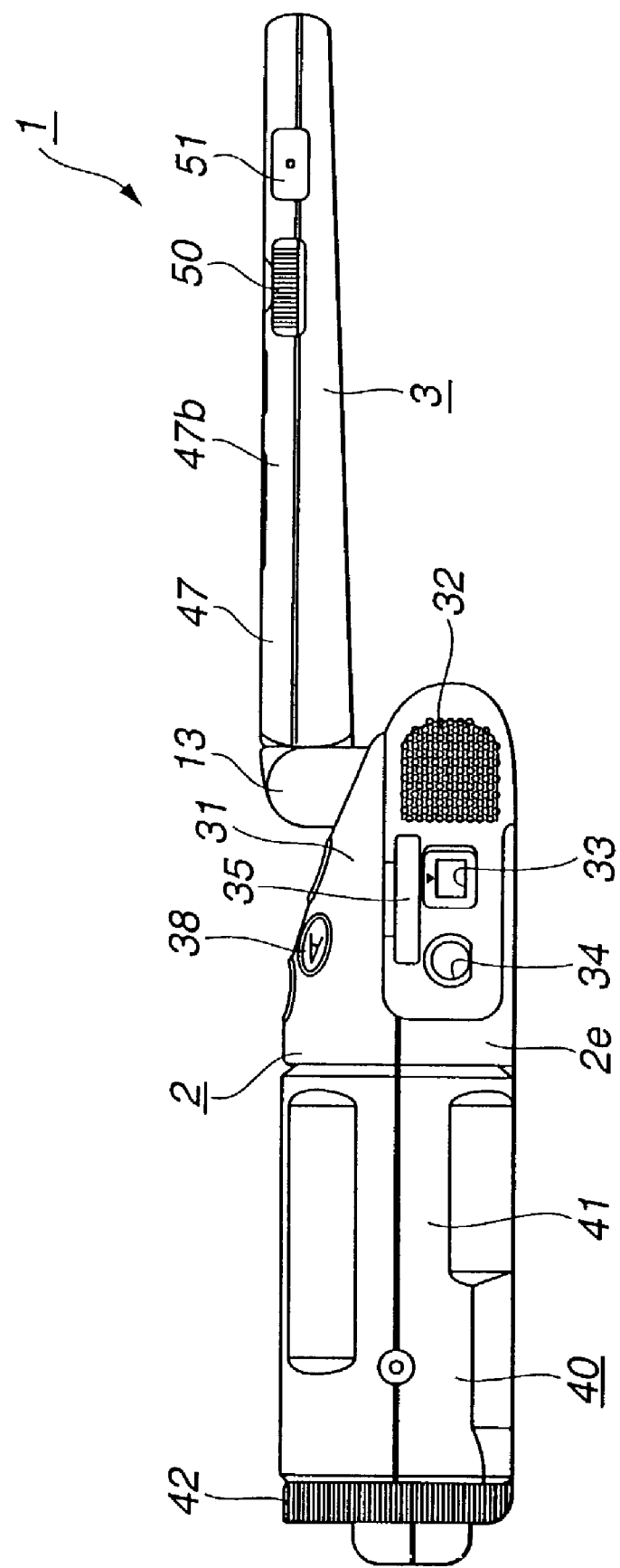
FIG. 5 is a right side view of the portable information processing device shown in FIG. 1.

A right end part of the computer body 2 has its rear end part projected rightward as a button arrangement part 31, as shown in FIGS. 1, 4 and 5. On the lateral side of the button arrangement part 31, that is, the right side part 2e of the computer body 2, from the rear end, a stereo speaker 32, a four-pin IEEE (Institute of Electrical and Electronics Engineers) 1394 terminal 33 for connecting a so-called video recorder, and an AV OUT terminal 34 for connecting a television are provided. Moreover, a slot 35 for inserting a plate-like storage medium is provided on the right side part 2e.

On the upper surface of the button arrangement part 31, there are provided an application button 36 on the forward side, a menu button 37 on the rear side, and an A-button 38 and a B-button 39 on the right and left sides, respectively, between the application and menu buttons 36, 37. These buttons 36 to 39 are used for shooting with a camera unit.

On the forward side from the button arrangement part 31, a camera unit 40 having a CCD (charge coupled device) image pickup element is provided. The camera unit 40 is rotatably supported on the computer body 2 via a shaft, not shown, provided at a part on the right side part and close to the front end of the computer body 2 (see FIGS. 1, 2, 4 and 5). This camera unit 40 has high-performance functions such as an optical 10-power zoom function, a shake correction function and an automatic focusing function.

Figure 7:
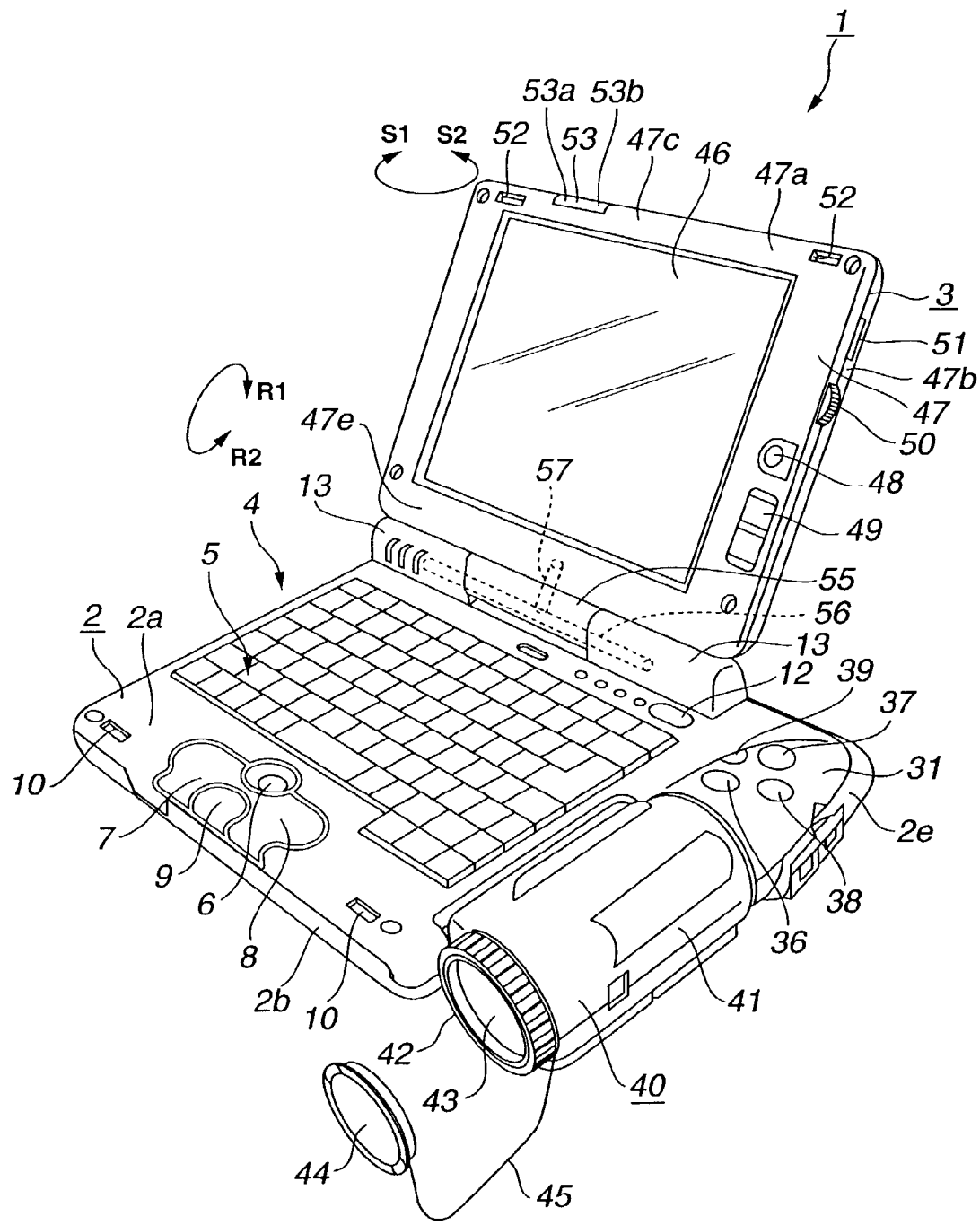
FIG. 7 is a perspective view showing the portable information processing device in a PC mode.

The camera unit 40 has a lens mirror cylinder 41, and a focusing ring 42 provided at one end part of the lens mirror cylinder 41. A predetermined group of lenses are arranged in the lens mirror cylinder 41. On the camera unit 40, a lens protection cap 44 for protecting a front lens 43 is detachably provided, as shown in FIG. 7. The lens protection cap 44 is attached to the distal end of a string 45 connected to the lens mirror cylinder 41. In shooting with the camera unit 40, the detached lens protection cap 44 can be inserted and held in the holding recess 28 formed in the bottom surface part 2d of the computer body 2.

On the display part 3, a display screen 46 having an LCD (liquid crystal display) is provided, as shown in FIG. 1. The circumferential edge of the display screen 46 is formed as a frame part 47. In the following description of the display part 3, the left-and-right direction is prescribed in the state where the display screen 46 faces forward or upward, and its one side supported on the computer body 2 is referred to as one end side and the opposite side is referred to as other end side. The side on which the display screen 46 is provided is referred to as front side, and the opposite side is referred to as back side.

On a front side 47a of the frame part 47, a capture button 48 functioning as a shooting button and a zoom knob 49 for changing the image angle are provided on the right end, as shown in FIG. 1. When the capture button 48 is half-pressed, the focusing of an image to be shot by the camera unit 40 is adjusted. When the capture button 48 is fully pressed, the focusing-adjusted image is taken in. As the zoom knob 49 is slid, the zoom function (wide-angle or telephoto) is performed, thus changing the image angle.

On a right side 47b of the frame part 47, a rotary dial 50 is provided, which is a rotating type dial with its part protruding laterally, as shown in FIGS. 1 and 5. When the rotary dial 50 is rotated, for example, a menu of application software on a rotary dial window displayed on the display screen 46 is scrolled. When the rotary dial 50 is pressed in the direction of the rotation axis, a selected menu item is executed.

The setting of the camera unit 40 is carried out by executing predetermined application software (hereinafter referred to as "software A"). The software A is executed by operating the rotary dial 50, and the execution of the software A enables selection of a static image mode or a dynamic image mode, selection of an arbitrary static image to be displayed on the display screen 46, selection of an arbitrary dynamic image to be displayed on the display screen 46, scroll of a static image and a dynamic image, reproduction and pause of a dynamic image, and so on.

On the right side 47b of the frame part 47, a back knob 51 is provided on the other end side from the rotary dial 50 (FIGS. 1 and 5). The back knob 51 has a function to restore the previous hierarchy of the selected menu when the rotary dial 50 is mistakenly operated.

Engagement holes 52, 52 are provided away from each other in the left-and-right direction at the other end part 47c on the front side 47a of the frame part 47, as shown in FIG. 1. A stereo microphone 53 is provided on the other end part 47c of the frame part 47, and the stereo microphone 53 has a first channel 53a on the left side and a second channel 53b on the right side (see FIGS. 1 and 4). At the other end part 47c on the back side 47d of the frame part 47, engagement holes 54, 54 are formed away from each other in the left-and-right direction (see FIG. 4).

A supporting member 55 which is long in the left-and-right direction is inserted between the supporting protrusions 13, 13 provided on the rear end of the computer body 2, and the display part 3 is supported on the computer body 2 via the supporting member 55 (see FIGS. 1, 2 and 7). Specifically, a first supporting shaft 56 penetrating the supporting protrusions 13, 13 and extending in the left-and-right direction is provided in the supporting member 55, and the supporting member 55 is made rotatable with respect to the supporting protrusions 13, 13 via the first supporting shaft 56. The display part 3 is made rotatable with respect to the supporting member 55 via a second supporting shaft 57 which is orthogonal to the first supporting shaft 56 (see FIG. 7). The display part 3 is rotated in an R1-R2 direction shown in FIG. 7 together with the supporting member 55 with respect to the supporting protrusions 13, 13, with the first supporting shaft 56 used as the center of rotation. The display part 3 is also rotated in an S1-S2 direction shown in FIG. 7 with respect to the supporting member 55 via the second supporting shaft 57.

Hereinafter, each use mode of the portable information processing device 1 will be described with reference to FIGS. 6 to 15. The portable information processing device 1 can be used as a video camera as well as a computer.

Figure 6:
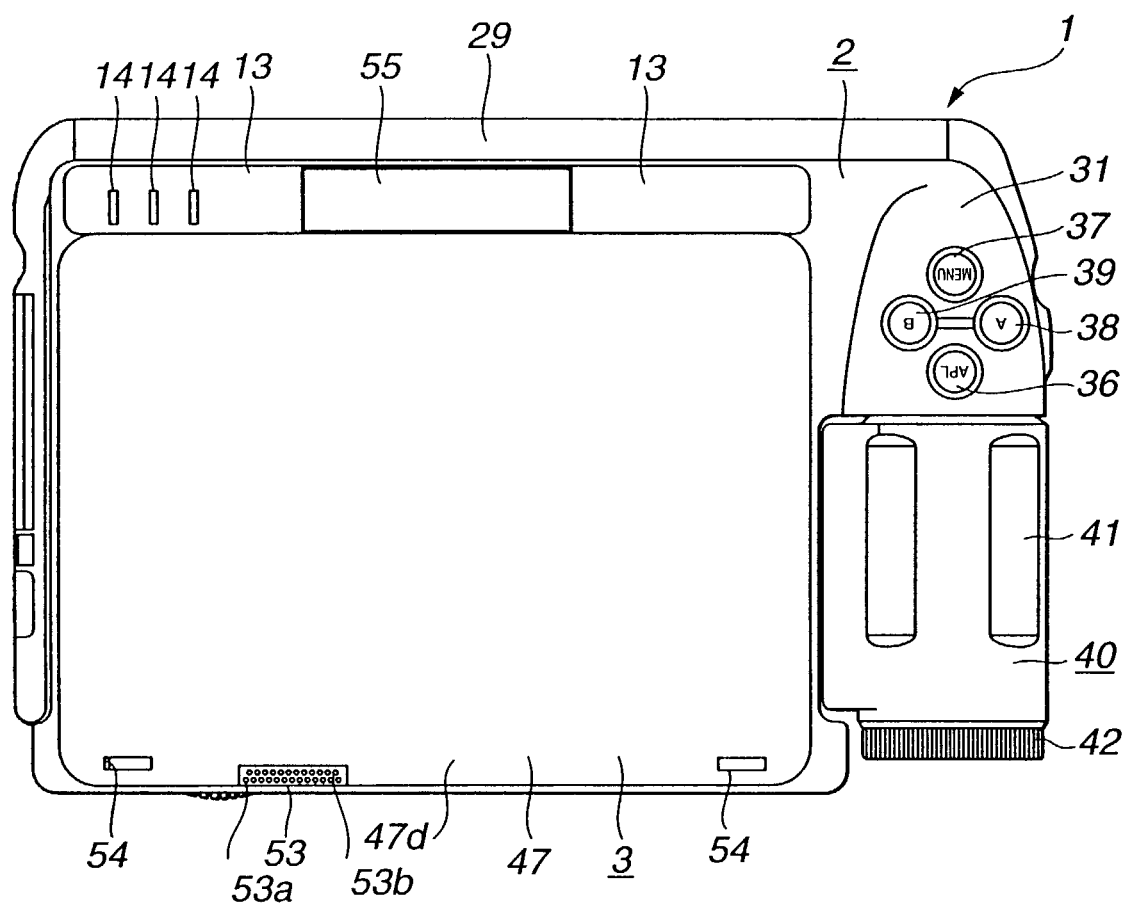
FIG. 6 is a plan view showing the portable information processing device, in which the operation keys are covered by a display part, with a display screen facing a keyboard.

FIG. 6 shows a mode in which the portable information processing device 1 is not used as a computer or a video camera, with the keyboard 4 closed by the display part 3 (hereinafter referred to as "nonuse mode"). In the nonuse mode, the display part 3 closes the keyboard 4, with the display screen 46 facing the keyboard 4. The lock pawls protruding upward from the lock pawl insertion holes 10, 10 of the computer body 2 are engaged with the opening edges of the engagement holes 52,52 formed on the front side 47a of the frame part 47 of the display part 3. The display part 3 is thus locked to the closing position.

If the power button 12 is operated to turn the power "ON" in the nonuse mode, the portable information processing device 1 can be immediately used as a computer or a video camera by rotating the display part 3.

FIG. 7 shows a mode in which the portable information processing device 1 is used mainly as a computer (hereinafter referred to as PC mode). The display part 3 is rotated from the closing position shown in FIG. 6 into the R1 direction shown in FIG. 7, thus opening the operation keys 5, 5, . . . of the keyboard 4 provided on the computer body 2. In this state, the user can operate the operation keys 5, the stick-type pointing device 6, the left click button 7, the right click button 8, the center button 9, the rotary dial 50 and the like so as to carry out input or editing of inputted information.

Even in the PC mode, the portable information processing device 1 can be used as a video camera by operating the rotary dial 50, the application button 36, the menu button 37, the A-button 38, the B-button 39 and the like. When using the portable information processing device 1 as a video camera, the user can turn the camera unit 40 to face a desired direction with respect to the computer body 2.

Figure 8:
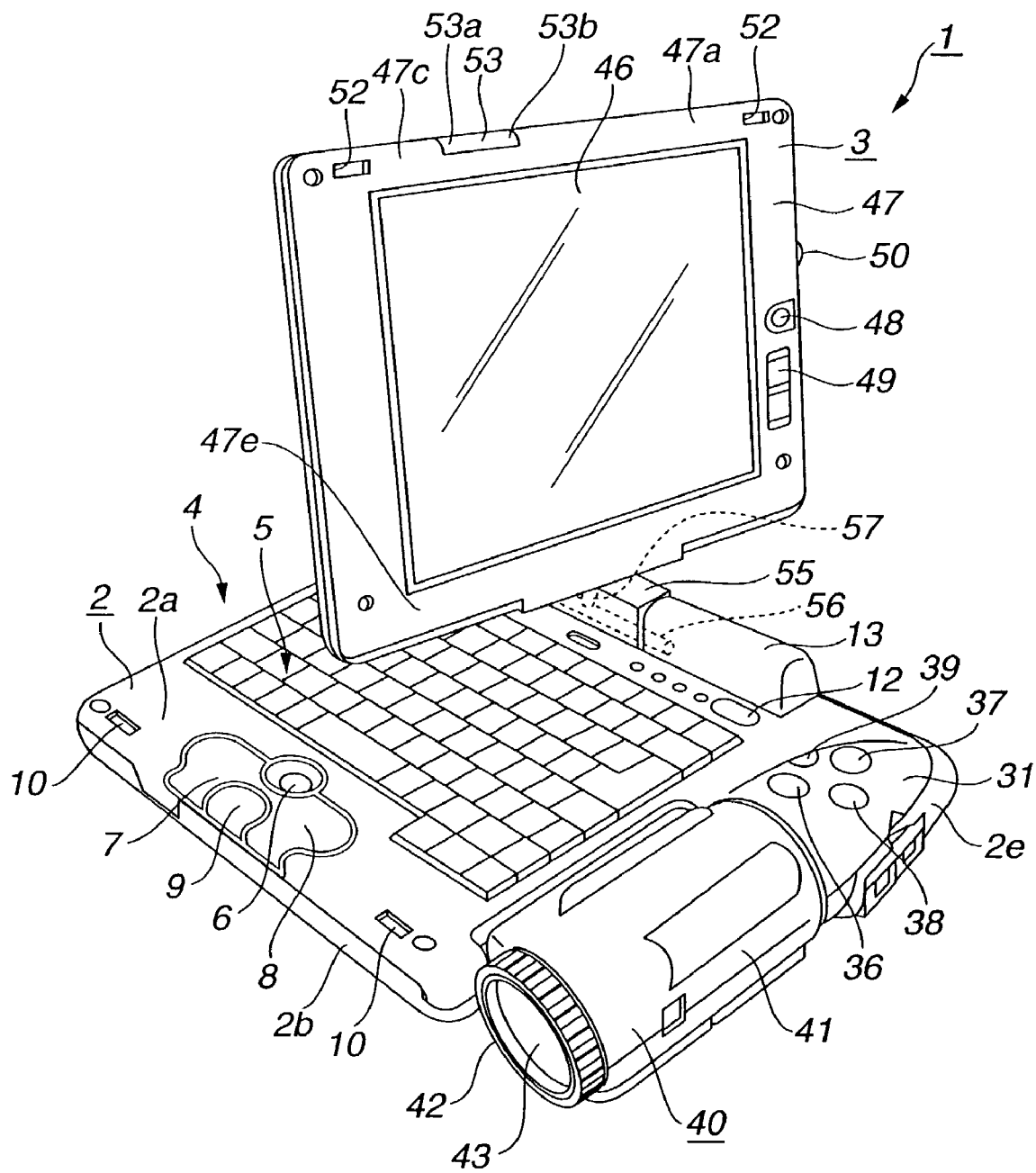
FIG. 8 is a perspective view showing the portable information processing device in which the display part is rotated with respect to the computer body from the PC mode.
Figure 9:
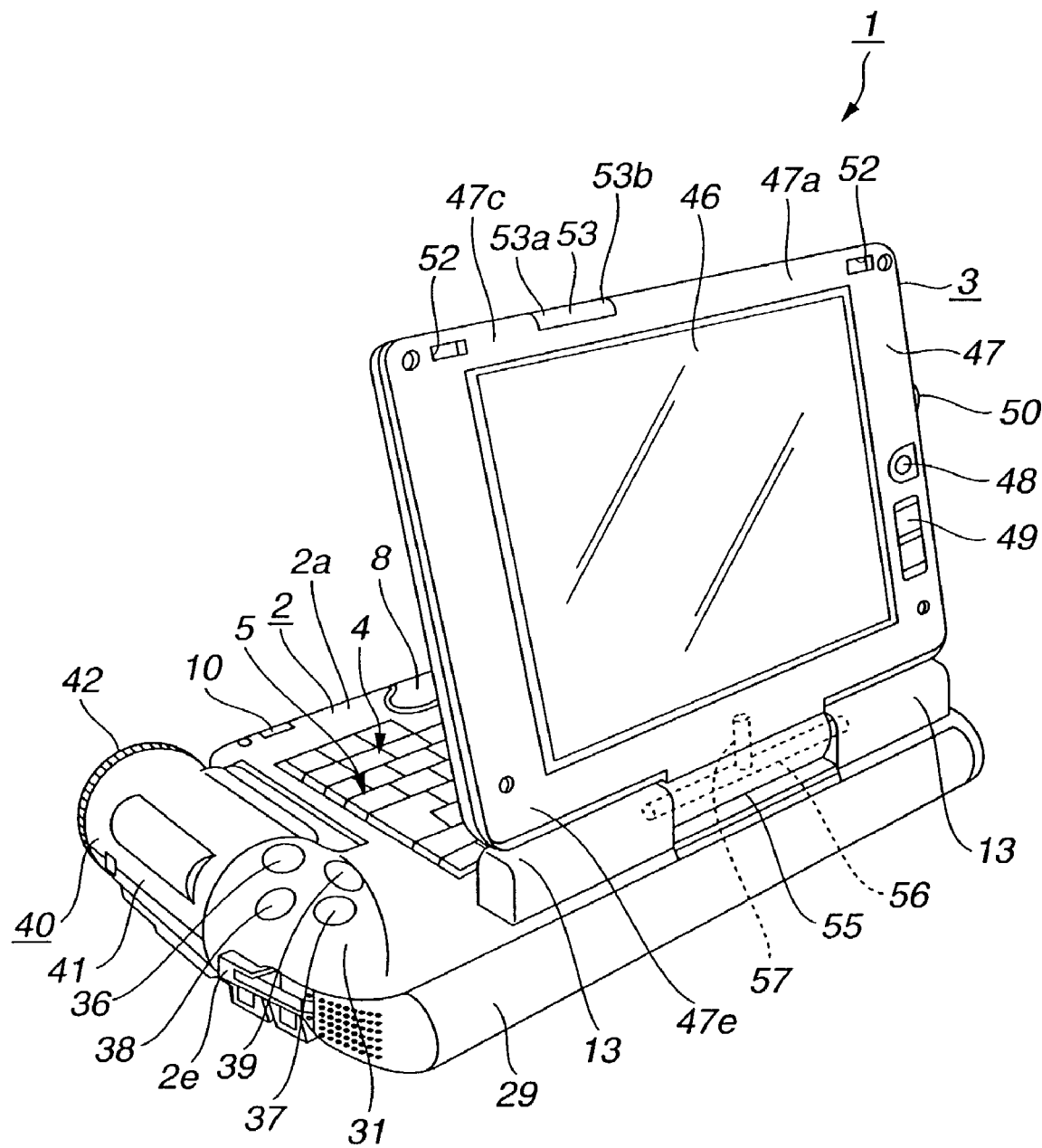
FIG. 9 is a perspective view showing the portable information processing device in a tripod shooting state.

From the PC mode shown in FIG. 7, the display part 3 is rotated about the second supporting shaft 57 into the S1 direction or S2 direction shown in FIG. 7 (see FIG. 8). Then, the rotation is stopped when the display part 3 is turned 180 degrees to the computer body 2 (see FIG. 9). At this point, the display screen 46 of the display part 3 faces substantially backward, and a tripod shooting mode is set, in which the portable information processing device 1 is mainly used with a tripod. In the tripod shooting mode, the portable information processing device 1 is fixed to the tripod by using the tripod screw hole 27 formed in the bottom surface part 2d of the computer body 2, and for example, fixed-point observation can be made. Meanwhile, in the tripod shooting mode with the display screen 46 of the display part 3 facing backward, for example, the portable information processing device 1 can be held by hands without fixing the computer body 2 to the tripod and thus can be used as a video camera.

In the tripod shooting mode, similarly to the PC mode, the camera unit 40 can be rotated to face a desired direction with respect to the computer body 2.

Figure 10:
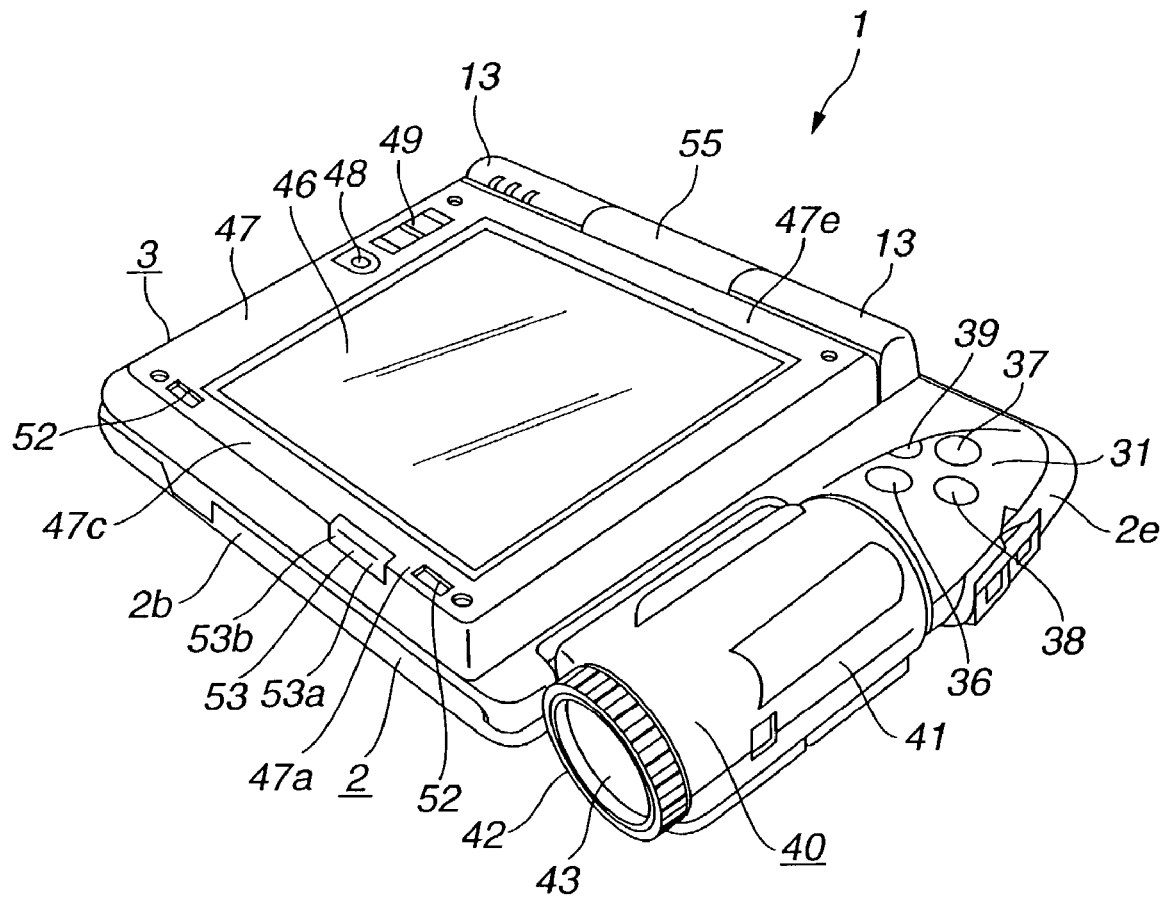
FIG. 10 is a perspective view showing the portable information processing device in which the operation keys are covered by the display part, with the display screen facing outward.
Figure 11:
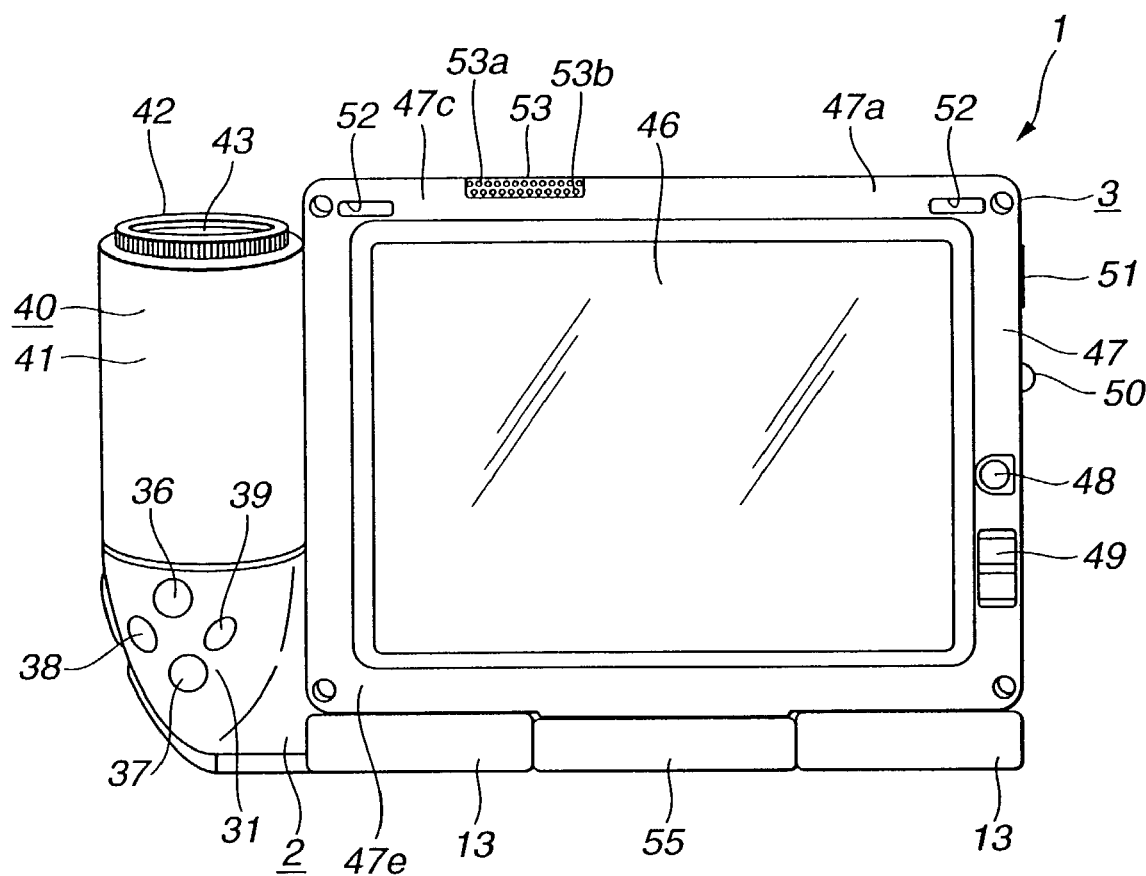
FIG. 11 is a perspective view showing the portable information processing device immediately before the use in an other-shooting state or self-shooting state.

In the tripod shooting mode, the display part 3 is rotated about the first supporting shaft 56 and the operation keys 5 are closed by the display part 3, as shown in FIG. 10. In the state where the operation keys 5 are closed by the display part 3, as the slide knob 16 provided on the front side 2b of the computer body 2 is slid leftward, as described above, the lock pawls protrude upward from the lock pawl insertion holes 10, 10 and are engaged with the engagement holes 54, 54, thus locking the display part 3 at the closing position. In this state, the display screen 46 faces outward.

The user holds the portable information processing device 1 so that the one end part 47e of the frame part 47 is on the lower side while the other end part 47c is on the upper side. The user holds both lateral edges of the portable information processing device 1 with his/her both hands and uses the camera unit 40 while looking forward, thus using the portable information processing device 1 as a video camera (see FIG. 11).

Figure 12:
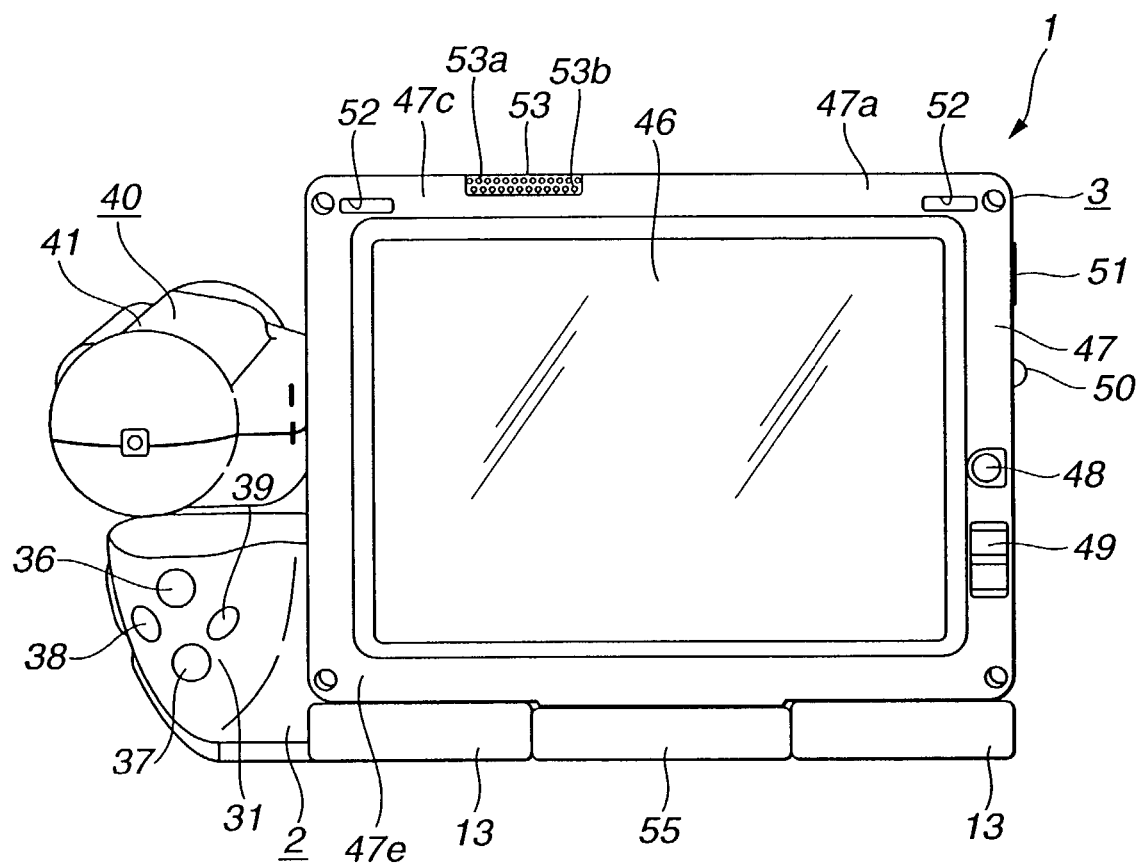
FIG. 12 is a perspective view showing the portable information processing device in the other-shooting state.
Figure 13:
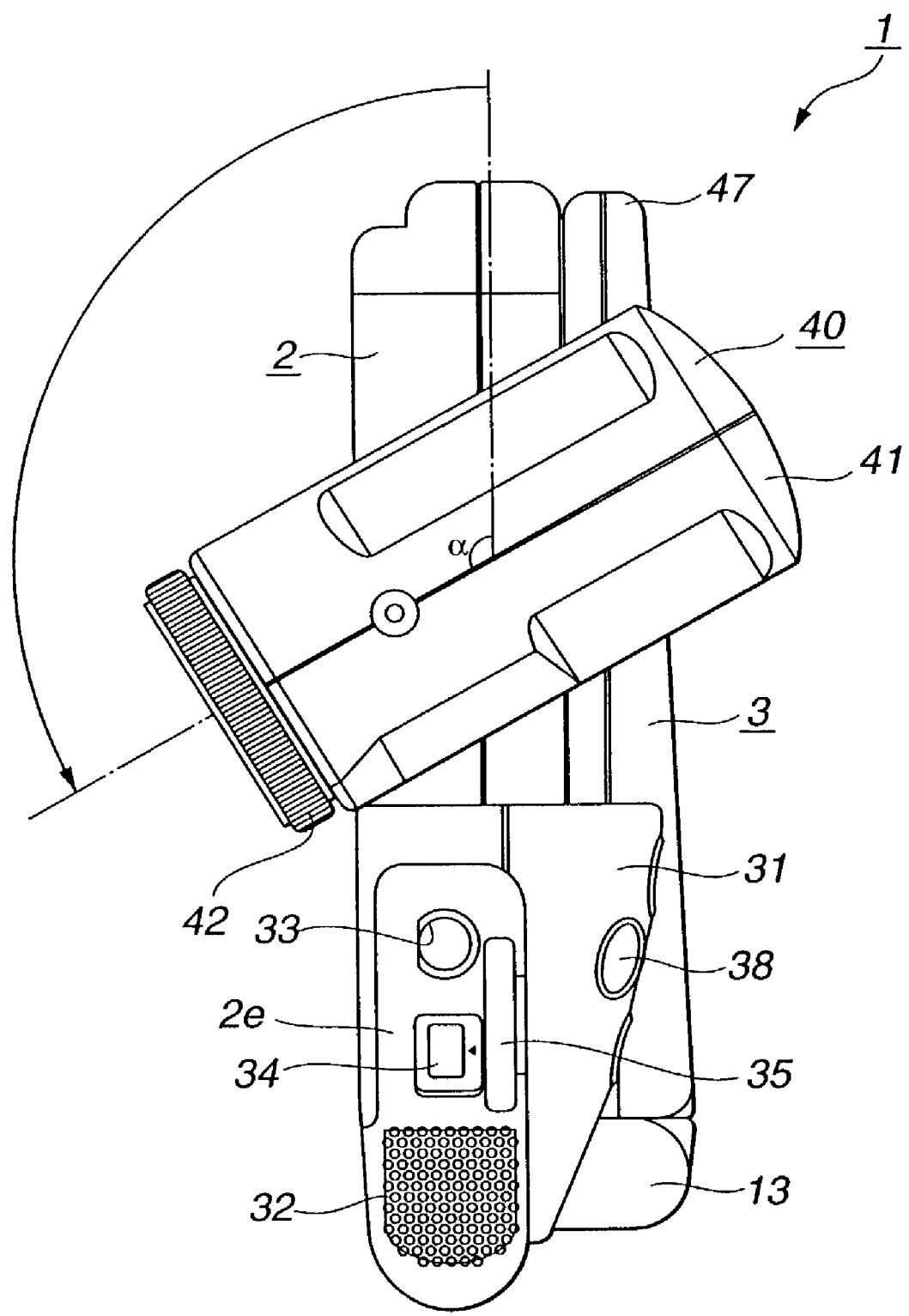
FIG. 13 is a side view of the portable information processing device shown in FIG. 12.

When shooting with the camera unit 40, the user can rotate the camera unit 40 so that the front lens 43 faces the opposite direction to the person who is shooting, and can shoot an object facing the person who is shooting (see FIG. 12). This use mode is an other-shooting mode mainly for shooting a facing object. The camera unit 40 can be rotated until its distal end is abutted against the button arrangement part 31 of the computer body 2. The maximum angle of rotation is 120 degrees, as shown in FIG. 13.

Figure 14:
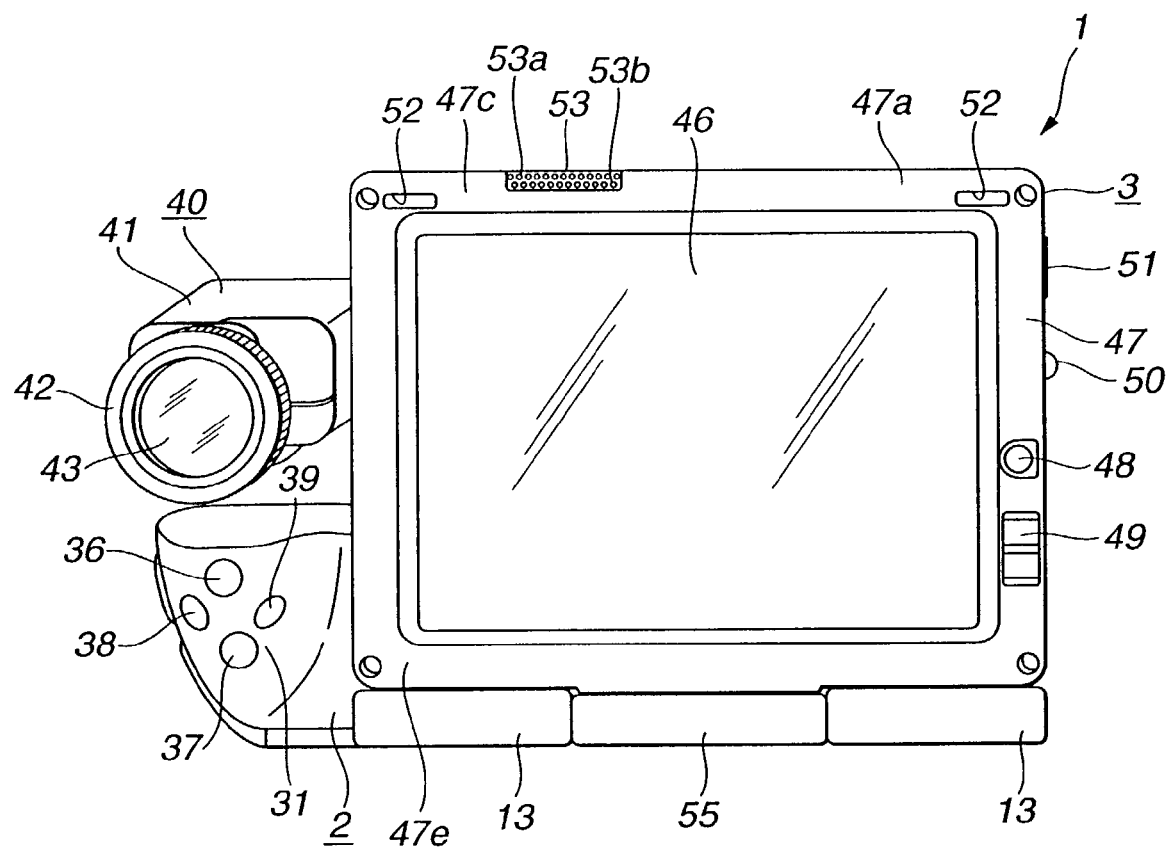
FIG. 14 is a perspective view showing the portable information processing device in the self-shooting state.
Figure 15:
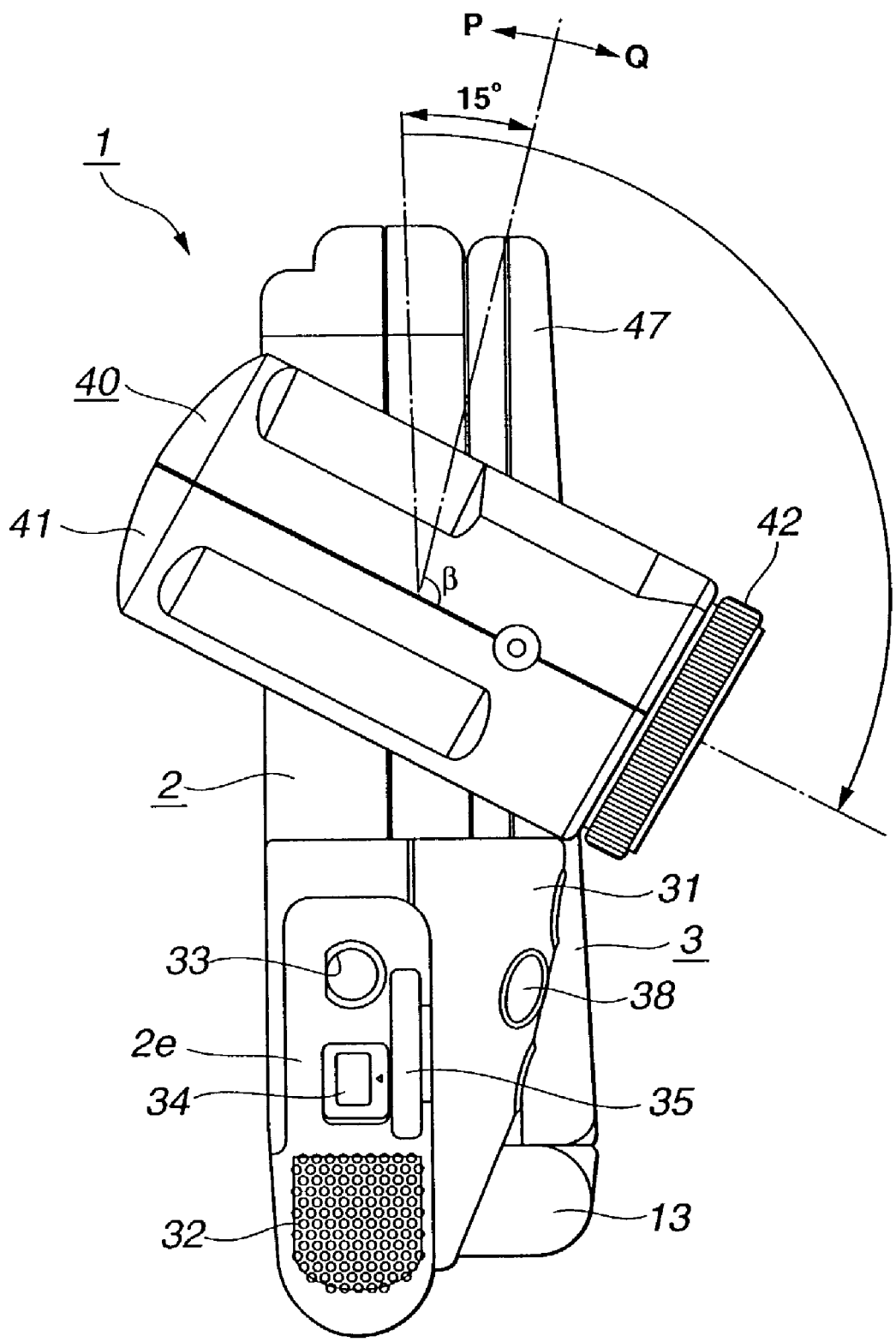
FIG. 15 is a side view of the portable information processing device shown in FIG. 14.

Moreover, when shooting with the camera unit 40, the user can rotate the camera unit 40 so that the front lens 43 faces the person who is shooting, and for example, the person who is shooting can shoot himself/herself (see FIG. 14). This use mode is a self-shooting mode mainly for shooting an object on the side of the person who is shooting. The camera unit 40 can be rotated until its distal end is abutted against the button arrangement part 31 of the computer body 2. The maximum angle of rotation is 120 degrees, as shown in FIG. 15. In the portable information processing device 1 according to the present invention, the camera unit 40 can be rotated within an angular range of 240 degrees (see FIGS. 13 and 15).

In the portable information processing device 1 according to the present invention, whether the direction of rotation of the camera unit 40 is inverted or not is detected when the camera unit 40 is rotated 15 degrees toward the person who is shooting from the center of the rotational range, as shown in FIG. 15, and an image displayed on the display screen 46 is inverted and an image in the correct up-and-down direction is displayed. The other-shooting mode is set when the camera unit 40 is rotated in the direction P shown in FIG. 15, and the self-shooting mode is set when the camera unit 40 is rotated in the direction Q shown in FIG. 15.

The use mode as a video camera using the camera unit 40 can also be used in a state in the process of setting each mode of FIG. 8 or the like, as well as the above-described PC mode, tripod shooting mode, other-shooting mode and self-shooting mode.

Figure 16:
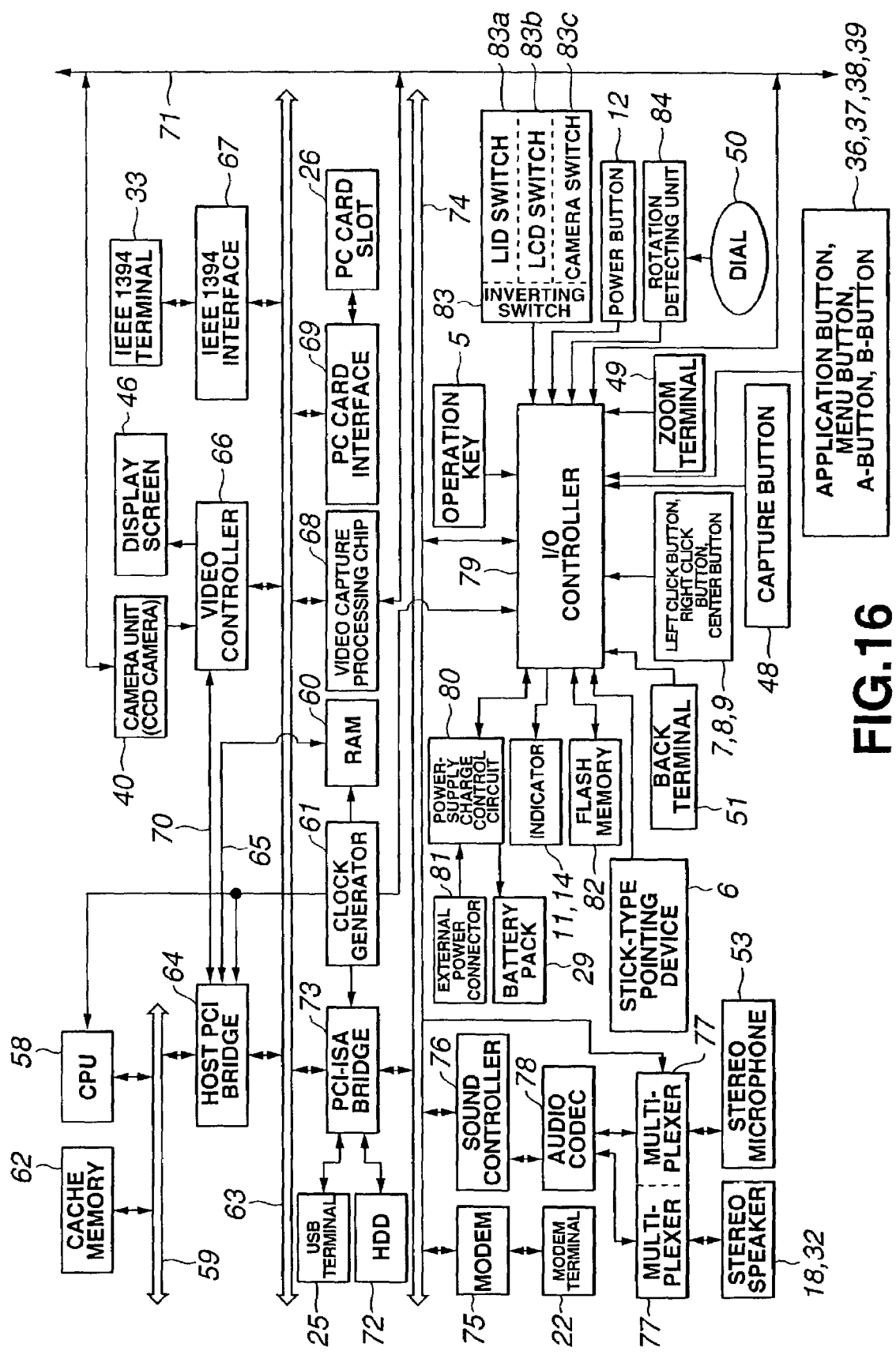
FIG. 16 is a block diagram showing the circuit structure of the portable information processing device.

The circuit structure of the portable information processing device 1 will now be described (see FIG. 16).

A CPU 58 for generally controlling various functions is provided in the computer body 2. The CPU 58 is connected to a host bus 59. The processing in accordance with various programs and application software loaded in a RAM (random access memory) 60 by the CPU 58 is executed at a predetermined operation speed on the basis of a system clock provided from a clock generator 61, thereby carrying out various functions.

A cache memory 62 is connected to the host bus 59. Data to be used by the CPU 58 is cached by the cache memory 62, thus carrying out high-speed access.

The host bus 59 is connected to a PCI (Peripheral Component Interconnect) bus 63 via a host PCI bridge 64. The host PCI bridge 64 is connected to the RAM 60 via a memory bus 65. The PCI bus 63 is connected with a video controller 66, an IEEE 1394 interface 67, a video capture processing chip 68, and a PC card interface 69. The host PCI bridge 64 controls transmission and reception of various data between the CPU 58 and the video controller 66, IEEE 1394 interface 67, video capture processing chip 68 or PC card interface 69, and also carries out memory control of the RAM 60 connected thereto via the memory bus 65. Moreover, the host PCI bridge 64 is connected with the video controller 66 via a signal line along an AGP (accelerated graphics port) 70, thus transferring image data between the host PCI bridge 64 and the video controller 66 at a high speed.

The video capture processing chip 68 is connected with an SM (system management) bus 71, which is a serial bus. When image data shot by the camera unit 40 is supplied to the video capture processing chip 68 via the SM bus 71, the supplied image data is temporarily stored into a frame memory, not shown, embedded in the video capture processing chip 68. Then, image compression processing is performed in conformity with the JPEG (Joint Photographic Experts Group) standard, thus generating JPEG image data. The resultant JPEG image data is again stored into the frame memory. The video capture processing chip 68 transfers the JPEG image data stored in the frame memory to the RAM 60 by using a bus master function in accordance with a command signal sent from the CPU 58, and transfers the image data to an HDD (hard disk drive) 72 as JPEG image data (static image data) or motion JPEG image data (dynamic image data).

The video controller 66 performs predetermined graphics processing on the image data shot by the camera unit 40 or the JPEG image data generated by the video capture processing chip 68, then stores the image data into a VRAM (video random access memory) embedded therein, not shown, then suitably reads out the image data, and displays the image on the display screen 46 having the LCD. The video controller 66 also outputs to the display screen 46 image data based on various application software supplied thereto and displays a plurality of window screens.

The PC card interface 69 is connected to the PC card slot 26, and is mounted via a PC card when adding an optional function. For example, the PC card interface 69 is connected to an external device such as a CD-ROM drive or DVD drive via a PC card.

The IEEE 1394 interface 67 is connected with the IEEE 1394 terminal 33. For example, the IEEE 1394 interface 67 is connected to an external device such as another computer unit or digital video camera via the IEEE 1394 terminal 33.

The PCI bus 63 is connected with an ISA bus 74 via a PCI-ISA (Industrial Standard Architecture) bridge 73. The HDD 72 and the USB terminal 25 are separately connected to the PCI-ISA bridge 73. The PCI-ISA bridge 73 is constituted by an IDE (Integrated Device Electronics) interface, a configuration register, an RTC (real time clock) circuit, a USB interface and the like. The PCI-ISA bridge 73 controls the HDD 72 via the IDE interface on the basis of the system clock provided from the clock generator 61.

On the hard disk of the HDD 72, an OS (operating system), an e-mail program, an autopilot program as well as various application software is stored, and such application software or the like is transferred to the RAM 60 in the process of start-up processing. The PCI-ISA bridge 73 controls, via the USB interface, external devices such as a floppy disk drive, a printer and a USB mouse connected thereto via the USB terminal 25, and also controls a modem 75 and a sound controller 76 connected to the ISA bus 74. The modem 75 is connected to the modem terminal 22. The sound controller 76 is separately connected to the stereo speakers 18, 32 and the stereo microphone 53 via multiplexers 77, 77 and an audio codec 78. A predetermined command signal is sent to the audio codec 78 from an I/O controller 79 via the ISA bus 74.

The modem 75 is connected with an Internet service provider via the modem terminal 22 and a telephone line or the Internet. The sound controller 76 carries out intake of an audio signal through the stereo microphone 53 and output of an audio signal to the stereo speakers 18, 32.

The ISA bus 74 is connected with the I/O controller 79 and is supplied with power from an external power connector 81 via a power-supply charge control circuit 80. When the power button 12 is "ON", the power is supplied to each part. The I/O controller 79 is connected with the clock generator 61 and operates on the basis of the system clock supplied from the clock generator 61. The power-supply charge control circuit 80 is controlled by the I/O controller 79 and controls the charging of the battery of the battery pack 29.

The I/O controller 79 is constituted by a microcontroller, an I/O interface, a CPU, a ROM, a RAM and the like. The I/O controller 79 controls input/output of data between the OS and application, and the peripheral equipments such as the display screen 46 and the HDD 72, on the basis of BIOS (basic input output system) stored in a flash memory 82.

The I/O controller 79 is connected with an inverting switch 83. The inverting switch 83 includes a lid switch 83a for detecting the rotating state of the display part 3 when the display part 3 is rotated in the R1-R2 direction shown in FIG. 7 to open/close the keyboard 4, an LCD switch 83b for detecting the rotating state of the display part 3 when the display part 3 is rotated in the S1-S2 direction shown in FIG. 7, and a camera switch 83c for detecting the rotating state of the camera unit 40 when the camera unit 40 is rotated with respect to the computer body 2. The lid switch 83a is provided, for example, at the rear end of the upper surface part 2a of the computer body 2. The LCD switch 83b is provided, for example, on the second supporting shaft 57. The camera switch 83c is provided, for example, on the shaft which supports the camera unit 40 on the computer body 2.

The I/O controller 79 is also connected with the capture button 48. When the capture button 48 is half-pressed or fully pressed as described above, a signal to that effect is inputted to the CPU 58 and a predetermined mode is set.

Specifically, if the capture button 48 is half-pressed when predetermined software for image pickup is being transferred from the hard disk of the HDD 72 to the RAM 60, the static image mode is set and a static image is frozen. If the capture button 48 is fully pressed, the frozen static image data is taken in and sent to the video controller 66. Then, as the capture button 48 is half-pressed, the focusing adjustment is carried out as described above. The focusing adjustment can also be carried out by a manual operation of rotating the focusing ring 42 of the camera unit 40.

On the other hand, if the capture button 48 is fully pressed when predetermined software for image pickup is not being transferred to the RAM 60, the dynamic image mode is set and dynamic image data is taken in and sent to the video controller 66.

In the ROM of the I/O controller 79, various programs are stored such as a rotary dial monitor program, a key input monitor program and an indicator control program. The rotary dial monitor program is a program for monitoring the states of the rotating operation and pressing operation of the rotary dial 50. The key input monitor program is a program for monitoring the input of the operation keys 5, the stick-type pointing device 6, the left click button 7, the right click button 8, the center button 9 and the like. The indicator control program is a program for controlling turning on/off of the indicators 11 and the indicators 14.

The I/O controller 79 is connected with the rotary dial 50 via a rotation detecting unit 84. When a certain menu item is selected and decided by the rotating operation and the pressing operation of the rotary dial 50, the I/O controller 79 store a rotating operation flag and a pressing operation flag in an I/O register stored in the RAM of the I/O controller 79 and sends a signal to that effect to the CPU 58.

In accordance with a jog dial utility program read out from the HDD 72 and started up on the RAM 60, the CPU 58 starts up application software corresponding to the decided menu item and executes predetermined processing.

The I/O controller 79 are separately connected with the application button 36, the menu button 37, the A-button 38 and the B-button 39, and various functions proper to these buttons 36, 37, 38, 39 are executed by operating the respective buttons 36, 37, 38, 39. Even when the power button 12 is off and the OS is not started up, the I/O controller 79 constantly operates on the basis of a jog dial monitor program under the control of the power-supply charge control circuit 80, and can start up application software decided by operating the rotary dial 50.

The I/O controller 79 is also connected with the SM bus 71. By supplying via the SM bus 71 various parameters for the camera unit 40 set by using the operation keys 5 and the rotary dial 50, the I/O controller 79 can control ON/OFF of the power in the camera unit 40 and adjust the brightness and contrast.

The I/O controller 79 also has programs for monitoring the operating states of the zoom knob 49 and the back knob 51, and sends signals corresponding to the operations of the zoom knob 49 and the back knob 51 to the CPU 58.

Hereinafter, the states of the lid switch 83a, the LCD switch 83b and the camera switch 83c in the above-described respective use modes, and the setting of the output state of the camera, the setting of the stereo microphone 53 and the setting of the stereo speakers 18, 32 in these states will be described with reference to FIG. 17.

When the display part 3 closes the keyboard 4 and is at the closing position, the lid switch 83a is "ON". As the display part 3 is rotated in the direction of opening the keyboard 4 from the closing position, the lid switch 83a is made "OFF". Therefore, the lid switch 83a is "ON" in the nonuse mode, the other-shooting mode and the self-shooting mode, and "OFF" in the PC mode and the tripod shooting mode.

When the display part 3 is not rotated in the S1-S2 direction shown in FIG. 7 and the display screen 46 faces forward, the LCD switch 83b is "OFF". As the display part 3 is rotated in the S1-S2 direction, the LCD switch 83b is made "ON". Therefore, the LCD switch 83b is "OFF" in the nonuse mode and the PC mode, and "ON" in the tripod shooting mode, the other-shooting mode and the self-shooting mode.

When the camera unit 40 is at a position rotated in the direction P shown in FIG. 15, the camera switch 83c is "OFF". When the camera unit 40 is at a position rotated in the direction Q shown in FIG. 15, the camera switch 83c is "ON". Therefore, the camera switch 83c is "ON" or "OFF" in the nonuse mode, the PC mode and the tripod shooting mode, and "OFF" in the other-shooting mode, and "ON" in the self-shooting mode.

When shooting is carried out by the camera unit 40, the shot data is sent to the video controller 66 as "normal image" data or "vertical and horizontal inversion" data by detecting the states of the lid switch 83a and the camera switch 83c. In this case, whether the lid switch 83a is "ON" or "OFF" is detected. If the lid switch 83a is "OFF", the data is "normal image" data. If the lid switch 83a is "ON", the result of detection of the camera switch 83c is referred to. If the camera switch 83c is "OFF", the data is "normal image" data. If the camera switch 83c is "ON", the data is "vertical and horizontal inversion" data. The "normal image" or "vertical and horizontal inversion" data is sent to a recording means such as a hard disk from the video controller 66 and recorded to the recording means on the basis of the operation to the capture button 48.

An image is shown in a preview on the display screen 46 on the basis of the data outputted from the camera unit 40. The image shown in the preview is the data processed on the basis of predetermined bus setting (hereinafter referred to as "preview setting").

The preview setting is carried out by detecting the respective states of the lid switch 83a, the LCD switch 83b and the camera switch 83c. If the LCD switch 83b is "OFF", the data outputted from the camera unit 40 is set to be "horizontally inverted". If the LCD switch 83b is "ON" and both the lid switch 83a and the camera switch 83c are "ON", the data is set to be "horizontally inverted". If at least one of the lid switch 83a and the camera switch 83c is "OFF", the data outputted from the camera unit 40 is set to be shown as it is in real time in the preview. Therefore, in the tripod shooting mode and the other-shooting mode, an image shown in the preview is a "normal image". In the PC mode and the self-shooting mode, an image shown in the preview is a "horizontally inverted" image.

As described above, since in the tripod shooting mode and the other-shooting mode, an image shown in the preview is a "normal image", while in the PC mode and the self-shooting mode, an image shown in the preview is a "horizontally inverted" image, images of natural forms with no uncomfortable feeling is constantly provided to the user.

Figure 18:
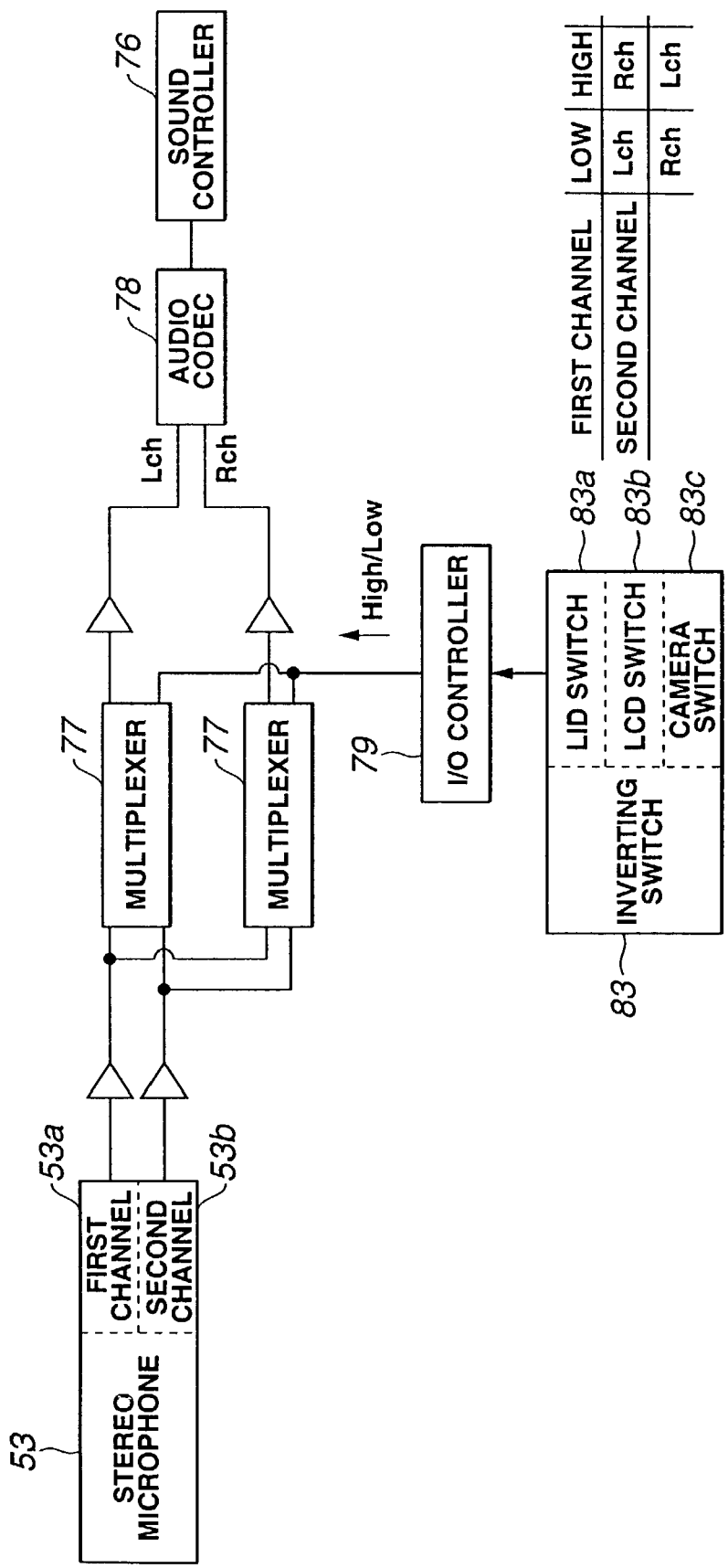
FIG. 18 is a block diagram for switching a first channel and a second channel of the stereo microphone.

FIG. 18 is a block diagram for channel switching between the first channel 53a and the second channel 53b of the stereo microphone 53. As described above, the channel on the left side when the display screen 46 is viewed from the front side is the first channel 53a, and the channel on the right side is the second channel 53b.

The sound controller 76 is connected with the multiplexers 77,77 via the audio codec 78, as described above, and each of the multiplexers 77, 77 is connected with the first channel 53a and the second channel 53b of the stereo microphone 53. On the basis of the results of detection of the "ON" or "OFF" states of the lid switch 83a, the LCD switch 83b and the camera switch 83c, a command signal of "High" or "Low" are sent to the multiplexers 77, 77 from the I/O controller 79. If the command signal is "High", the first channel 53a is set to function as the channel R (right) and the second channel 53b is set to function as the channel L (left). If the command signal is "Low", the first channel 53a is set to function as the channel L and the right channel 53b is set to function as the channel R. The states of the channels thus set are held. The audio signal is converted to a digital signal by the audio codec 78 and is recorded to the recording means such as a hard disk via the sound controller 76.

Figure 19:
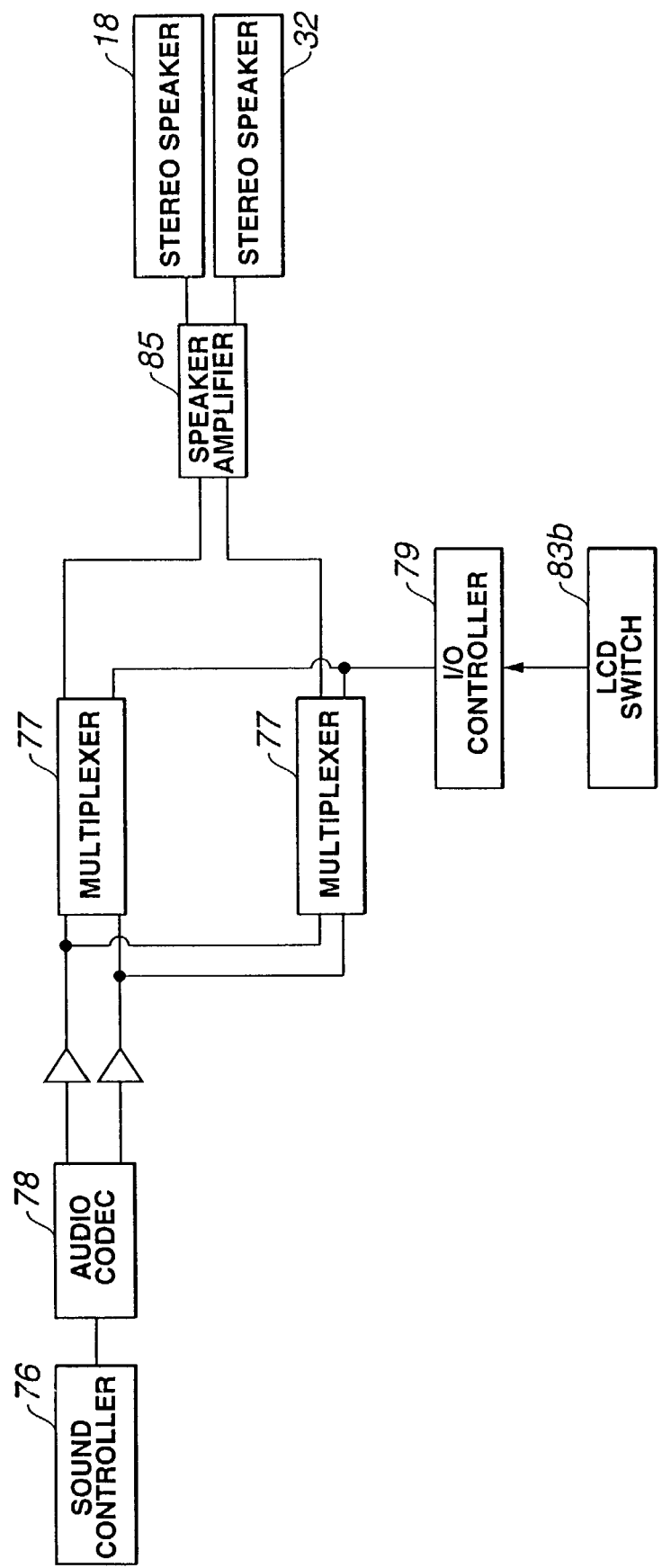
FIG. 19 is a block diagram for carrying out channel switching of the stereo speaker.

FIG. 19 is a block diagram for channel switching of the stereo speakers 18, 32.

The sound controller 76 is connected with the multiplexers 77, 77, as described above, and the each of the multiplexers 77, 77 is connected with the stereo speaker 18 and the stereo speaker 32 via a speaker amplifier 85. On the basis of the result of detection of the "ON" or "OFF" state of the LCD switch 83b, a command signal is sent to the multiplexers 77, 77 from the I/O controller 79. If the LCD switch 83b is "OFF", the stereo speaker 18 is set to function as the channel L and the stereo speaker 32 is set to function as the channel R in accordance with the command signal from the I/O controller 79. If the LCD switch 83b is "ON", the stereo speaker 18 is set to function as the channel R and the stereo speaker 32 is set to function as the channel L in accordance with the command signal from the I/O controller 79. The states of the channels thus set are held and sounds are outputted from the channel-set stereo speakers 18, 32 via the speaker amplifier 85.

Figure 20:
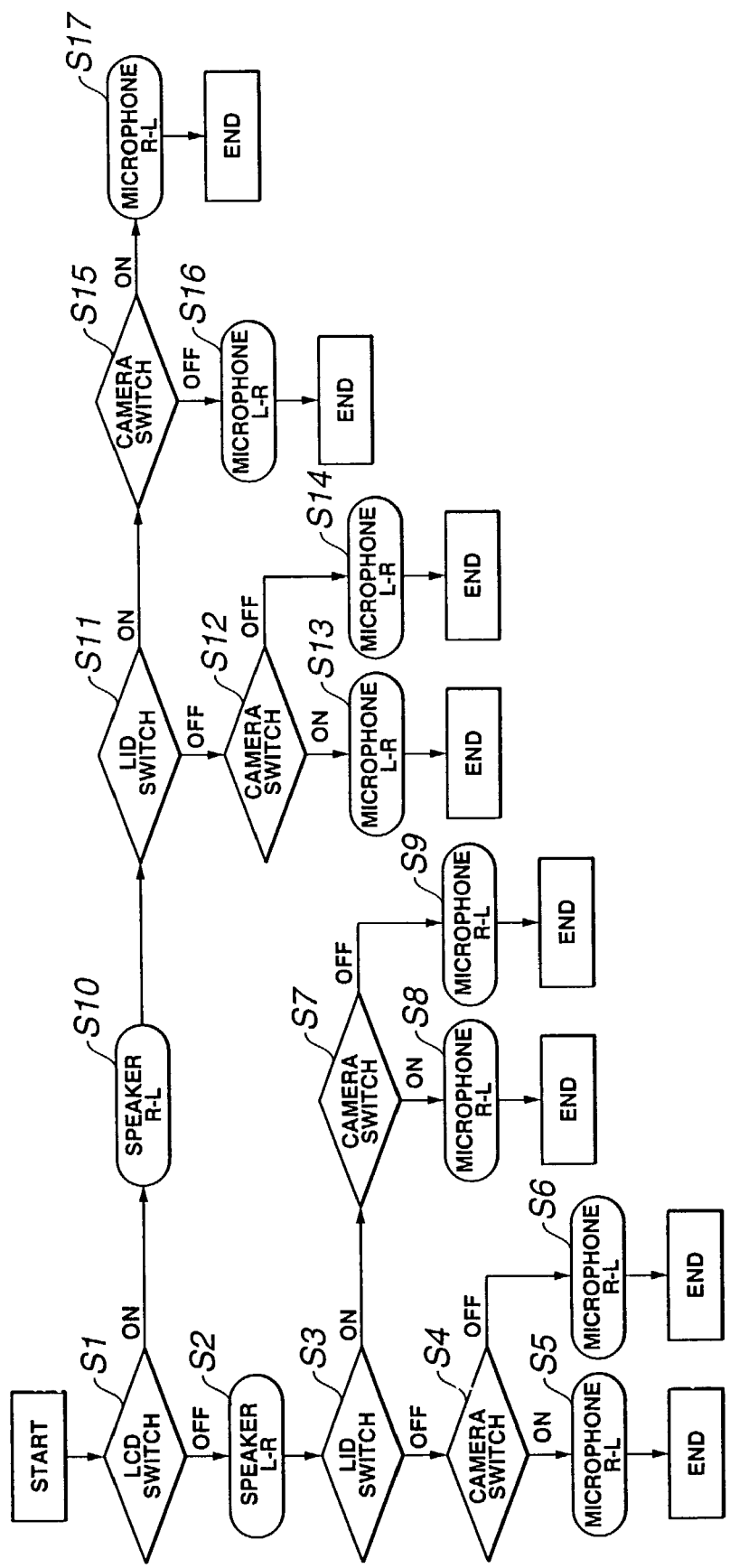
FIG. 20 is a flowchart showing the channel switching of the first channel and the second channel of the stereo microphone, and the channel switching of the stereo speaker.

The flows of the above-described channel switching of the first channel 53a and the second channel 53b of the stereo microphone 53 and the channel switching of the stereo speakers 18, 32 will now be described with reference to FIG. 20.

(S1) The processing starts and the "ON" or "OFF" state of the LCD switch 83b is detected.

(S2) If the LCD switch 83b is "OFF" at step 1, the stereo speaker 18 is set as the channel L and the stereo speaker 32 is set as the channel R.

(S3) Following step 2, the "ON" or "OFF" state of the lid switch 83a is detected.

(S4) If the lid switch 83a is "OFF" at step 3, the "ON" or "OFF" state of the camera switch 83c is detected.

(S5) If the camera switch 83c is "ON" at step 4, the first channel 53a of the stereo microphone 53 is set as the channel R and the second channel 53b is set as the channel L.

(S6) Even if the camera switch 83c is "OFF" at step 4, the first channel 53a of the stereo microphone 53 is set as the channel R and the second channel 53b is set as the channel L.

(S7) Even if the lid switch 83a is "ON" at step 3, the "ON" or "OFF" state of the camera switch 83c is detected.

(S8) If the camera switch 83c is "ON" at step 7, the first channel 53a of the stereo microphone 53 is set as the channel R and the second channel 53b is set as the channel L.

(S9) Even if the camera switch 83c is "OFF" at step 7, the first channel 53a of the stereo microphone 53 is set as the channel R and the second channel 53b is set as the channel L.

(S10) If the LCD switch 83b is "ON" at step 1, the stereo speaker 18 is set as the channel R and the stereo speaker 32 is set as the channel L.

(S11) Following step 10, the "ON" or "OFF" state of the lid switch 83a is detected.

(S12) If the lid switch 83a is "OFF" at step 11, the "ON" or "OFF" state of the camera switch 83c is detected.

(S13) If the camera switch 83c is "ON" at step 12, the first channel 53a of the stereo microphone 53 is set as the channel L and the second channel 53b is set as the channel R.

(S14) Even if the camera switch 83c is "OFF" at step 12, the first channel 53a of the stereo microphone 53 is set as the channel L and the second channel 53b is set as the channel R.

(S15) Even if the lid switch 83a is "ON" at step 11, the "ON" or "OFF" state of the camera switch 83c is detected.

(S16) If the camera switch 83c is "OFF" at step 15, the first channel 53a of the stereo microphone 53 is set as the channel L and the second channel 53b is set as the channel R.

(S17) If the camera switch 83c is "ON" at step 15, the first channel 53a of the stereo microphone 53 is set as the channel R and the second channel 53b is set as the channel L.

When the channel setting of the first channel 53a and the second channel 53b of the stereo microphone 53 is carried out at step 5, step 6, step 8, step 9, step 13, step 14, step 16 and step 17, the processing ends.

As described above, as a result of the channel switching of the first channel 53a and the second channel 53b of the stereo microphone 53 and the channel switching of the stereo speakers 18, 32, the setting of the channels of the stereo microphone 53 and the stereo speakers 18, 32 in the respective modes is as shown in FIG. 17.

With respect to the stereo microphone 53, in the PC mode and the self-shooting mode, the first channel 53a functions as the channel R and the second channel 53b functions as the channel L. In the tripod shooting mode and the other-shooting mode, the first channel 53a functions as the channel L and the second channel 53b functions as the channel R. With respect to the stereo speakers 18, 32, in the PC mode, the stereo speaker 18 functions as the channel L and the stereo speaker 32 functions as the channel R. In the tripod shooting mode, the other-shooting mode and the self-shooting mode, the stereo speaker 18 functions as the channel R and the stereo speaker 32 functions as the channel L.

In the nonuse mode, if the power button 12 is operated and the power is "ON", the output of the camera, the preview setting, and the channel switching setting of the stereo microphone 53 and the stereo speakers 18, 32 are carried out. However, the respective items are not described in FIG. 17 since the device is not used as a computer or a video camera in the nonuse mode.

The CPU 58, the I/O controller 79, the sound controller 76 and the multiplexers 77, 77 function as control means for switching a channel signal of an audio signal outputted from the stereo microphone 53. The CPU 58 and the video controller 66 function as display processing means for displaying an image shot by the camera unit 40, onto the display screen 46 in real time.

Moreover, the recording means for recording images and audio signals picked up by the camera unit 40 is provided in the portable information processing device 1. The recording means may be, for example, a hard disk.

As described above, in the PC mode and the self-shooting mode, the first channel 53a of the stereo microphone 53 functions as the channel R and the second channel 53b functions as the channel L. In the tripod shooting mode and the other-shooting mode, the first channel 53a functions as the channel L and the second channel 53b functions as the channel R. With respect to the stereo speakers 18, 32, in the PC mode, the stereo speaker 18 functions as the channel L and the stereo speaker 32 functions as the channel R. In the tripod shooting mode, the other-shooting mode and the self-shooting mode, the stereo speaker 18 functions as the channel R and the stereo speaker 32 functions as the channel L. Therefore, sounds of natural forms are constantly provided to the user with no different feeling between inputted sounds and outputted sounds.

In the above description, the present invention is applied to the portable information processing device 1 having the keyboard 4 provided on the computer body 2. However, the present invention can be also applied to an equipment having no keyboard such as a video camera, and a disc-shaped recording medium such as a magneto-optical disc or a storage medium connected to an equipment via a contact can be used as the recording means.

The above-described inversion of an image and the switching of the stereo microphone 53 and the stereo speakers 18, 32 may be carried out by executing programs for carrying out these functions which are inputted to the portable information processing device 1 from a program storage medium having these programs recorded therein.

The specific shapes and structures of the respective parts shown in the above-described embodiment are simply examples in embodying the present invention. It should be understood that these specific examples do not limit the technical scope of the present invention.

INDUSTRIAL APPLICABILITY

According to the present invention, an inputted sound can be appropriately allocated to a right channel signal and a left channel signal and thus recorded to the recording means in accordance with the use state of the portable information processing device. The inputted sound can be appropriately allocated to a right channel signal and a left channel signal and thus recorded to the recording means in accordance with the opening/closing state and the rotating state of the display part with respect to the body part and the rotating state of the image pickup means with respect to the body part.

According to the present invention, images picked up by the image pickup means can be displayed in natural forms to the user with no uncomfortable feeling, irrespective of the use state of the portable information processing device.

The invention claimed is:

1. A portable information processing device, comprising:
 a body part;
 an image pickup unit which is rotatably supported on the body part;
 a display part supported so that it can open/close and rotate on the body part;
 at least one pair of stereo microphones provided on the display part;
 a detection unit configured to detect a rotating state of the image pickup unit with respect to the body part;
 a control unit configured to allocate a first channel signal and a second channel signal of an audio signal outputted from the at least one pair of stereo microphones to a right channel signal and a left channel signal and for switching the allocation of the channel signals on the basis of the result of the detection by the detection unit;
 a recording unit configured to record the audio signal allocated by the control unit; and
 a pair of stereo speakers provided on the body part, wherein the control unit is configured to allocate a right channel signal and a left channel signal of a reproduced audio signal output to the stereo speakers on the basis of the result of the detection by the detection unit,
 wherein the control unit causes a picked-up image signal from the image pickup unit to be vertically and horizontally inverted on the basis of the result of the detection by the detection unit, and causes the vertically and horizontally inverted picked-up image signal to be recorded to the recording unit, when the display part is at the closing position and inverted with respect to the body part, and a camera unit is rotated in the same direction of the display screen of the inverted display part, and wherein the control unit is configured to allocate the right channel of audio signal to a left side speaker and the left channel of audio signal to a right side speaker on the basis that the display part is inverted with respect to the body part whether the camera unit is rotated or not, and whether the display part is at the opening position or not.

2. The portable information processing device as claimed in claim 1, wherein the control unit is configured to allocate the first channel signal outputted from the stereo microphone to the left audio signal and the second channel signal outputted from the stereo microphone to the right audio signal on the basis that the display part is at the closing position and inverted with respect to the body part, and the camera unit is rotated in the opposite direction of the display screen of the inverted display part.

3. The portable information processing device as claimed in claim 1, wherein the control unit is configured to allocate the first channel signal outputted from the stereo microphone to the right audio signal and the second channel signal outputted from the stereo microphone to the left audio signal on the basis that the display part is at the closing position and inverted with respect to the body part, and the camera unit is rotated in the direction of the display screen.

4. A portable information processing device, comprising:
a body part;
image pickup means for rotatably supporting the body part;
a display part supported so that it can open/close and rotate on the body part;
at least one pair of stereo microphones provided on the display part;
detection means for detecting a rotating state of the image pickup means with respect to the body part;
control means for allocating a first channel signal and a second channel signal of an audio signal outputted from the at least one pair of stereo microphones to a right channel signal and a left channel signal and for switching the allocation of the channel signals on the basis of the result of the detection by the detection means;
recording means for recording the audio signal allocated by the control means; and
a pair of stereo speakers provided on the body part, wherein the control means allocates a right channel signal and a left channel signal of a reproduced audio signal output to the stereo speakers on the basis of the result of the detection by the detection means,
wherein the control means causes a picked-up image signal from the image pickup means to be vertically and horizontally inverted on the basis of the result of the detection by the detection means, and causes the vertically and horizontally inverted picked-up image signal to be recorded to the recording means, when the display part is at the closing position and inverted with respect to the body part, and a camera means is rotated in the same direction of the display screen of the inverted display part, and
wherein the control means allocates the right channel of audio signal to a left side speaker and the left channel of audio signal to a right side speaker on the basis that the display part is inverted with respect to the body part whether the camera means is rotated or not, and whether the display part is at the opening position or not.

5. The portable information processing device as claimed in claim 4, wherein the control means allocates the first channel signal outputted from the stereo microphone to the left audio signal and the second channel signal outputted from the stereo microphone to the right audio signal on the basis that the display part is at the closing position and inverted with respect to the body part, and the camera means is rotated in the opposite direction of the display screen of the inverted display part.

6. The portable information processing device as claimed in claim 4, wherein the control means allocates the first channel signal outputted from the stereo microphone to the right audio signal and the second channel signal outputted from the stereo microphone to the left audio signal on the basis that the display part is at the closing position and inverted with respect to the body part, and the camera means is rotated in the direction of the display screen.

7. An information processing method for a portable information processing device having a body part, an image pickup unit rotatably supported on the body part and a display part supported so that it can open/close and rotate on the body part, the display part having at least one pair of stereo microphones and a pair of stereo speakers provided thereon, the method comprising:
detecting a rotating state of the image pickup unit with respect to the body part;
controlling an audio signal by allocating a first channel signal and a second channel signal of the audio signal outputted from the at least one pair of stereo microphones to a right channel signal and a left channel signal and for switching the allocation of the channel signals on the basis of the result of the detection by the detection unit; and
recording the audio signal allocated by the control unit, wherein the controlling further includes allocating a right channel signal and a left channel signal of a reproduced audio signal output to the stereo speakers on the basis of the result of the detection by the detection unit,
wherein the controlling causes a picked-up image signal from the image pickup unit to be vertically and horizontally inverted on the basis of the result of the detection by the detection unit, and causes the vertically and horizontally inverted picked-up image signal to be recorded to the recording unit, when the display part is at the closing position and inverted with respect to the body part, and a camera unit is rotated in the same direction of the display screen of the inverted display part, and
wherein the controlling further includes allocating the right channel of audio signal to a left side speaker and the left channel of audio signal to a right side speaker on the basis that the display part is inverted with respect to the body part whether the camera unit is rotated or not, and whether the display part is at the opening position or not.

* * * * *